(12) United States Patent
Kiarostami

(10) Patent No.: US 8,838,485 B2
(45) Date of Patent: Sep. 16, 2014

(54) AUTOMATED PROCESSING OF DIGITAL MEDIA COLLECTIONS FOR DISTRIBUTED E-COMMERCE

(75) Inventor: Ahmad Kiarostami, San Francisco, CA (US)

(73) Assignee: Bay Photo, Inc., Scotts Valley, CA (US)

( * ) Notice: Subject to any disclaimer, the term of this patent is extended or adjusted under 35 U.S.C. 154(b) by 432 days.

(21) Appl. No.: 13/085,472

(22) Filed: Apr. 12, 2011

(65) Prior Publication Data

US 2011/0191206 A1   Aug. 4, 2011

Related U.S. Application Data

(63) Continuation-in-part of application No. 12/606,084, filed on Oct. 26, 2009.

(60) Provisional application No. 61/471,697, filed on Apr. 5, 2011.

(51) Int. Cl.
*G06Q 30/00* (2012.01)
*G06Q 30/06* (2012.01)

(52) U.S. Cl.
CPC ........ *G06Q 30/0633* (2013.01); *G06Q 30/0641* (2013.01)
USPC .......................... 705/27.1; 705/26.1; 705/26.8

(58) Field of Classification Search
USPC ................................................ 705/26.1–27.2
See application file for complete search history.

(56) References Cited

U.S. PATENT DOCUMENTS

2003/0093321 A1*  5/2003  Bodmer et al. ................. 705/26
2004/0260614 A1* 12/2004  Taratino et al. ................ 705/26
2011/0302063 A1* 12/2011  Bey et al. ....................... 705/30

OTHER PUBLICATIONS

Rabinovich, E., Maltz, A., & Sinha, R. K. (2008). Assessing markups, service quality, and product attributes in music CDs' Internet retailing. Production and Operations Management, 17(3), 320-337.*

* cited by examiner

*Primary Examiner* — Resha Desai
(74) *Attorney, Agent, or Firm* — Donald R. Boys; Central Coast Patent Agency, Inc.

(57) ABSTRACT

A method and a network device for e-commerce on a seller's website, including maintaining by an e-commerce server a catalog of products wherein each product may be ordered in conjunction with a media item and wherein the price of a product varies in accordance with the media item, receiving, by a buyer's web browser, a web page from the seller's website, the web page including at least one image, each image corresponding to a media item, enabling the buyer to select an image, said image corresponding to a desired media item, and a product, sending information about the selected image and the selected product, to the e-commerce server wherein the e-commerce server has no previous price information about said desired media item, dynamically determining, the purchase price of the selected product in conjunction with the desired media item, and enabling the buyer to specify a purchase order for the product.

15 Claims, 17 Drawing Sheets

FIG. 2B

| | | 450 |
|---|---|---|

Print Sizes and Pricing

| | DESCRIPTION | SIZE | | | | PROFIT% | PRICE | OFFERED |
|---|---|---|---|---|---|---|---|---|
| 452 — ✦ | 6" Width | 6"x6" | 6"x7.5" | 6"x8" | ... | 74.67 | US$15.00 | ☑ |
| ✦ | 8" Width | 8"x8" | 8"x10" | 8"x10.7" | ... | 47.50 | US$8.00 | ☑ |
| ✦ | 9" to 10" Width | 10"x10" | 10"x12.5" | 9"x12" | ... | 75.38 | US$40.00 | ☑ |
| ✦ | 12" Width | 12"x12" | 12"x15" | 12"x16" | ... | 13.57 | US$14.00 | ☑ |
| ✦ | 16" to 18" Width | 16"x16" | 16"x20" | 16"x24" | ... | 69.00 | US$100.00 | ☑ |
| ✦ | 20" Width | 20"x20" | 20"x25" | 20"x26.7" | ... | 30.76 | US$46.00 | ☑ |
| ✦ | 24" Width | 24"x24" | 24"x30" | 24"x32" | ... | | | ☐ |
| ✦ | 30" Width | 30"x30" | 30"x37.5" | 30"x40" | ... | | | ☐ |

FIG. 4C

Auto Pickup Profiles

You have not set up any Auto Pick-up profiles yet.

- Connect To Mystorage1.com using: 1 Search Path and 2 Lookup Patterns
- Connect To Mystorage2.com using: 1 Search Path and 2 Lookup Patterns
- Connect To Mystorage3.com using: 1 Search Path and 2 Lookup Patterns

Auto Pickup Profile

AUTOMATED PROCESSING OF DIGITAL MEDIA COLLECTIONS FOR DISTRIBUTED E-COMMERCE

REFERENCE TO RELATED APPLICATIONS

This application is a Continuation-In-Part of U.S. patent application Ser. No. 12/606,084, entitled EMBEDDABLE DISTRIBUTED E-COMMERCE AND COMMUNITY BUILDING SYSTEM FOR DIGITAL MEDIA, filed on Oct. 26, 2009 by inventors Nasser K. Manesh and Ahmad Kiarostami. This application also claims benefit of U.S. Provisional Application No. 61/471,697, entitled AUTOMATED PROCESSING OF DIGITAL MEDIA COLLECTIONS FOR DISTRIBUTED E-COMMERCE, filed on Apr. 5, 2011 by inventor Ahmad Kiarostami.

COPYRIGHT NOTICE

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

FIELD OF THE INVENTION

The present invention relates to e-commerce for digital media. In particular, it provides rule-based e-commerce for collections of digital media items managed by a seller.

BACKGROUND OF THE INVENTION

Advances in Internet technology such as blogging platforms and website creation tools makes it easy and inexpensive for people to build blogs and websites. Such ease of use and cost effectiveness has enabled many individuals without computer programming background to use the Internet as a medium to present their "creations" to the rest of the world. These creations may include inter alia digital media such as photos, videos, graphics, illustrations, animations, and music, as well as physical items such as paintings, crafts, mechanical devices, sculptures, and hand-made greeting cards.

In some cases individuals or organizations wish to sell their creations over the Internet, i.e. perform e-commerce. Typically, individuals, henceforth referred to as sellers, use an existing, centralized, e-commerce website to list and sell their creations to avoid the cost and complexity of attempting to add e-commerce capability to their own personal blog or website. Examples of existing, centralized, e-commerce websites that enable a seller to sell their creations, commonly referred to as marketplaces, include Amazon Marketplace and eBay. Amazon Marketplace is provided by Amazon Inc. of Seattle, Wash. eBay is provided by eBay Inc. of San Jose, Calif. Marketplace websites enable a seller to list items for sale and to provide descriptive information including text, photos, and videos on a web page provided by the e-commerce provider. Marketplaces also provide shopping carts, accept online payments, make payments to the seller after deducting any sales commissions, and provide the seller with sales reports. A marketplace, in effect, creates and manages a store for the seller. While marketplaces often attract large numbers of buyers, the seller is not able to offer their creations in the context of a highly personalized, boutique-style website. Thus there is a need to sell creations easily and efficiently from a seller's personal website, thus forming a distributed or decentralized e-commerce marketplace.

One prior art approach to enabling websites and blogs to add e-commerce capability is shopping cart plug-ins that can be easily added to web pages. A disadvantage with this approach is that shopping cart plug-ins require the seller to add items to a catalog before they can be offered for sale. In effect, the seller must create a product catalog and establish pricing before offering items for sale from their website. However, this can be cumbersome, especially for photographers and other creators of digital media items who may add many media items to their website at a time. Therefore, it would be advantageous to be able to enable items to be sold immediately after they are added to a website without having to first add them to a catalog.

In cases the items being sold are based on some type of digital content, henceforth referred to as digital media items. For example, the items being sold may be prints of a seller's digital photos; or an item of merchandise with a seller's digital photo printed on it such as a greeting card, or a CDs or DVDs that includes a seller's digital content. In such cases, it may be convenient for the seller to manage related digital media items as a group or collection. For example, rather than assigning a price to print, or card, individually it may be more convenient to assign a single price to a collection. Thus, there is a need to enable a seller to conveniently assign individual media items to collections and to enable a seller to define rules for the automated processing of collections.

SUMMARY OF THE INVENTION

The present invention provides a system and method which enables a seller to easily add e-commerce services directly to his/her own website. The invention provides product selection and shopping cart capabilities right on a seller's website. It also provides the back-office services required to fulfill the purchase orders by integrating with various third party fulfillment services. As a result the seller gets a full service e-commerce solution on their own blog or website. The subject invention enables shoppers to select items at different websites and blog sites that also use the subject invention as their e-commerce solution. The e-commerce capabilities allow purchasing in various ways including inter alia direct purchase, auctioned purchase through bidding, purchase along with an escrow through a third-party, purchase by paying in installments, and deferred payment purchase.

Each step of the sales process, from selection of the product to accepting payment from a buyer takes place on the seller's website, and the back-end processes such as printing and shipping are managed by the invention. No intervention or work must be performed by the seller. In short, the invention turns a seller's website into a boutique where he/she can post photos to his/her website, and generate sales of merchandise that incorporates the photos or the digital media items they represent or of the merchandise depicted in the photo, and collect a share of each sale. All steps related to sales of various forms of products from prints to licenses to merchandise are performed or managed by the invention. Further, the buyer only needs to interact with the seller's website.

The present invention includes embodiments that enables sellers to sell items from their website without first having to add the items to a product catalog or establish pricing on a product-by-product basis. In a preferred embodiment, this capability is enabled through the use of collections where a collection refers to set of media items. A seller may define prices for products to be manufactured in conjunction with any media item in a collection, i.e. pricing is determined based on the collection to which a media item belongs rather than being established on an individual basis. Further, a seller may define assignment rules that automatically assign media items to collections based on their embedded metadata.

There is thus provided in accordance with an embodiment of the present invention a method for e-commerce on a seller's website, including maintaining by an e-commerce server a catalog of products sold by a seller on a seller's website wherein each product may be ordered in conjunction with a media item selected by a buyer and wherein the price of a product varies in accordance with the media item, receiving, by a buyer's web browser, a web page from the seller's website, said web page including at least one image, each image corresponding to a media item, enabling, by the web browser, the buyer to select an image, said image corresponding to a desired media item, and a product from the catalog of products, sending information about the selected image and the selected product, by the buyer's web browser, to the e-commerce server wherein the e-commerce server has no previous price information about said desired media item, dynamically determining, by the e-commerce server, the purchase price of the selected product in conjunction with the desired media item, said purchase price based in part on the information about the selected image, enabling, by the buyer's web browser, the buyer to specify a purchase order for the selected product in conjunction with the desired media item at the purchase price determined by said dynamically determining.

A network device, including a storage device useable to store a catalog of products sold by a seller on a seller's website wherein each product may be ordered in conjunction with a media item selected by a buyer and wherein the price of a product varies in accordance with the media item, and a processor that is programmed to enable access to the storage device and to perform actions, including receiving, from a buyer's web browser, information about a selected image on the seller's website and a selected product from the catalog of products said selected image corresponding to a desired media item, said network device having no previous purchase price information about said desired media item, dynamically determining the purchase price of the selected product in conjunction with the desired media item, said purchase price based in part on the information about the selected image, and providing said purchase price to the buyer's web browser.

BRIEF DESCRIPTION OF THE DRAWINGS

The present invention will be more fully understood and appreciated from the following detailed description, taken in conjunction with the drawings in which:

FIG. 2B is an example user interface that enables a buyer to specify printing options for a digital image, in accordance with an embodiment of the present invention;

FIG. 4C is an example user interface for a seller portal that enables a seller to specify the price for a product, in accordance with an embodiment of the present invention;

FIG. 9 is an exemplary user interface that enables a seller to define an auto pick-up profile to be used for substituting a digital media item from an external storage system for a digital media item used for purposes of display, in accordance with an embodiment of the present invention.

DETAILED DESCRIPTION

Figure 1:
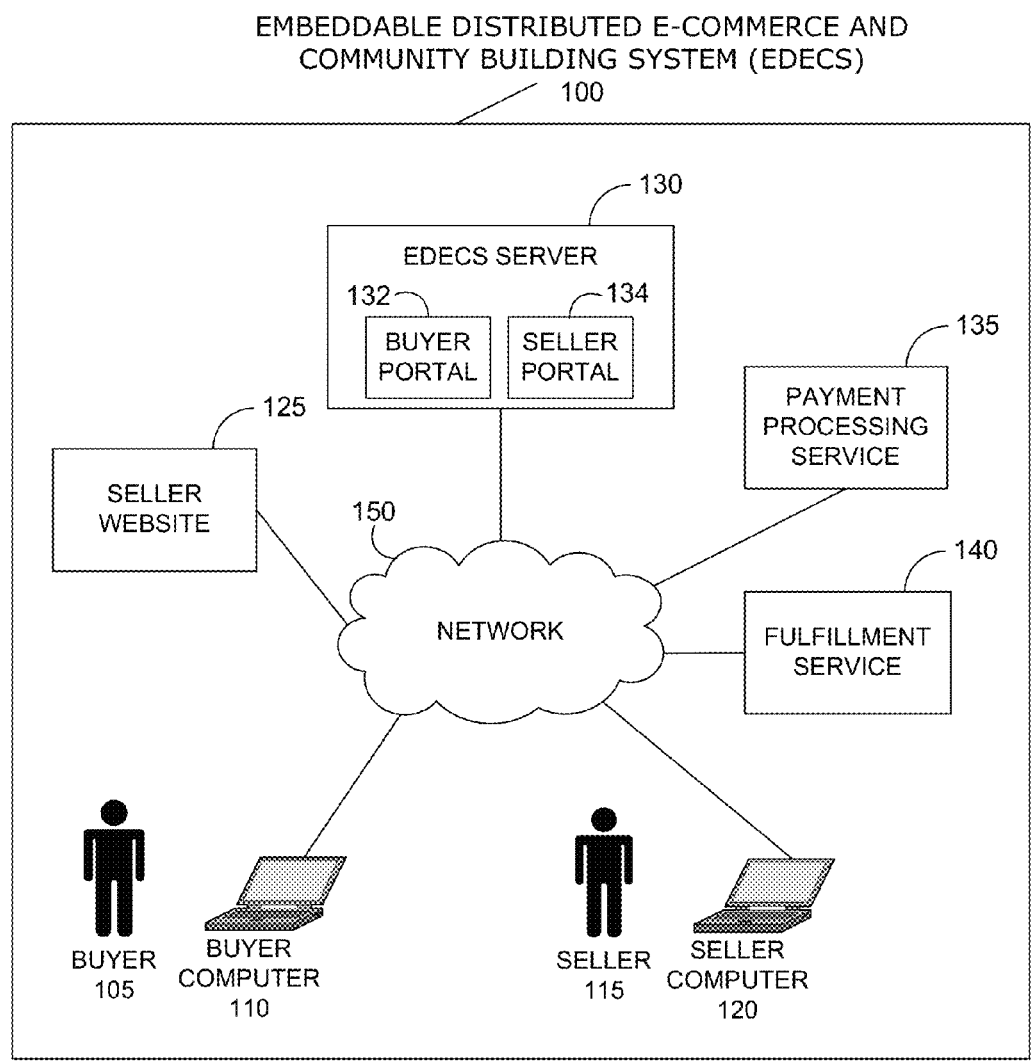
FIG. 1 is a simplified block diagram of an embeddable distributed e-commerce and community building system (EDECS) that enables a buyer using a buyer computer to purchase one or more creations from a seller website and/or seller blog, in accordance with an embodiment of the present invention.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, business methods, or devices. Accordingly, the present invention may take the form of an entirely hardware embodiment or an embodiment combining software and hardware aspects. The following detailed description is, therefore, not to be taken in a limiting sense.

The present invention describes a system, referred to herein as an embeddable distributed e-commerce and community building system or simply "EDECS", which adds e-commerce and online community capabilities to an existing website or blog. EDECS enables a customer to purchase items directly from a seller's website or blog. EDECS provides both an e-commerce user interface on an existing website or blog, and the back-office processes required to prepare the products requested and fulfill a purchase order.

As used herein the following terms have the meaning given below:

Creation, media item, or item-refers to an item of media including inter alia a photo, digital image, video, digital video, animation, or music, or to a physical item such as a painting, craft, mechanical device, sculpture, or hand-made greeting card. A creation or item may also refer to an item of service such as painting a portrait.

Digital media item, or media item—refers to a creation or media item that is stored digitally. Digital media items include inter alia digital images, digital video, animations, digital music, and digital voice recordings.

Seller—refers to a person that offers one or more creations from a seller website.

Buyer or visitor—refers to a person that uses a web browser running on a personal computer, mobile device, or other type of computer capable of running a web browser to visit a seller website.

Web page—refers to an HTML web page that is viewed using a web browser. As used herein, the term web page may also refer to a blog page. Where a blog is a specialized type of web page, typically maintained by an individual whose entries are commonly displayed in reverse-chronological order. A web page may include client-side scripting code in addition to HTML as is discussed later.

Website—refers to a collection of static or dynamically generated web pages that are addressed with a common domain name in a network that uses Internet protocols. A web site is hosted on at least one web server which is a specialized type of server computer that serves web pages to a client computer running a web browser application. As used herein, the term website also refers to a blog site that provides blog pages to a web browser, including variations such as a photoblog, which enables the blog owner to easily embed and annotate images, or a videoblog, which enables the blog owner to easily embed and annotate videos.

Client-side script—refers to programming language instructions written in a client-side scripting language that are executed by a web browser. such as JAVASCRIPT from Sun Microsystems. A client-side script may be embedded in a web page. Alternatively, a web page may include an instruction that causes it to download a client-side script from a web server. A client-side script is interpreted by a client-side scripting engine that is embedded in or controlled by a web browser running in a client computer. A client-side scripting engine enables the web browser to perform functions not available through HTML commands such as advanced graphics, database access, and computations. Unless otherwise specified, the JAVASCRIPT client side-scripting language is used in this invention. JAVASCRIPT is a trademark of Sun Microsystems of Mountain View, Calif., and is supported by most commercial browsers. Other client-side scripting languages that can alternatively be used include the Java open source programming language, Flash from Adobe Systems Inc., and ActiveX from the Microsoft Corporation. For purposes of specificity, all of the client-side capabilities described herein can be accomplished using a web browser such as Mozilla Firefox, Microsoft Internet Explorer, and Apple Safari in conjunction with JAVASCRIPT version 1.5, or greater. A description of JAVASCRIPT version 1.5 may be found in the book JavaScript: The Definitive Guide, by David Flanagan, August 2006, published by O'Reilly Media, Inc., which is incorporated herein by reference.

Now reference is made to FIG. 1, which is a simplified block diagram of an embeddable distributed e-commerce and community building system (EDECS) that enables a buyer using a buyer computer to purchase one or more creations from a seller website, in accordance with an embodiment of the present invention. As depicted in FIG. 1, a buyer computer 110, a seller computer 120, a seller website 125, an EDECS server 130, a payment processing service 135, and a fulfillment service 140, are interconnected via a network 150. Typically, network 150 is the public Internet. However network 110 may also be a private network, a local area network or any other type of network that enables a plurality of computers and/or online services to exchange digital messages. Further seller website 125 and EDECS server 130 may each be implemented using either a single computer server or a plurality of computer servers working cooperatively.

A seller 115 offers photos and other information about his/her creations via seller website 125. Seller 115 uses seller computer 120 to search for or browse web pages, create and edit web pages, to manage seller website 125 and to interact with EDECS server 130. Seller computer 120 is any PC, laptop, mobile device or other device that runs a web browser that enables a seller to interact with a seller portal 134 provided by EDECS server 130. The term seller's web browser, as used herein, refers to a web browser that runs in seller computer 120.

Seller website 125 may be inter alia a website that offers conventional web pages or a blog that provides blog pages to a web browser running in buyer computer 110. Seller website 125 may include a server computer. Seller website 125 may host more than one website. Seller website 125 may be operated by seller 115 or by a web hosting provider, i.e. a company that hosts websites for sellers. The creations offered for sale on seller website 125 may include digital media items. In one embodiment, seller website 125 displays digital images in web pages that each digital image representing a digital media item offered for sale or licensing by seller 115. Seller 115 participates in EDECS 100 by adding a script or set of instructions, referred to as a "widget embedding script", to the web pages on seller website 125. When executed by the web browser running in buyer computer 110, the widget embedding script causes a client side application to be downloaded to the web browser. The client-side script, when executed by the web browser running in buyer computer 110 communicates with EDECS server 130 to provide e-commerce services.

A buyer 105 uses buyer computer 110 to search for or browse, select and purchase creations available from seller website 125. Buyer computer 110 is any PC, laptop, mobile device or other device that runs a web browser that enables a buyer to visit seller website 125 and to open, view and interact with web pages provided by seller website 125. The term buyer's web browser, as used herein, refers to a web browser that runs in buyer computer 110.

EDECS server 130 is a network computing device, that is a computer server or network or cluster of computers or a network accessible service, that cooperatively provide a service to client computers such as buyer computer 110 and seller computer 120. EDECS server 130 provides e-commerce services that enable buyer 105 to purchase one or more creations from seller website 125. EDECS server 130 generates an electronic purchase order for each purchase made by buyer 105. EDECS server 130 uses payment processing service 135 to obtain payment from buyer 105 and fulfillment service 140 to fulfill a purchase order.

EDECS server 130 provides a buyer portal 132 to buyer 105 that provides information about his/her purchase orders and seller portal 134 to seller 115 that enables seller 115 to configure e-commerce for his/her creations and to obtain sales information for his/her creations. Buyer portal 132 is discussed in further detail with reference to FIGS. 4A-C and FIG. 6. Seller portal 134 is discussed in further detail with reference to FIGS. 5A-B and FIG. 6.

EDECS server 130 interacts with a number of payment processing services 135, including credit card payment processing services and online payment services, such as PAYPAL, GOOGLE CHECKOUT, and AMAZON FLEXIBLE PAYMENTS. Credit card payments are provided by a commercial payment processing service 135 that provides merchant accounts for credit card processing such as Authorize.net. The Authorize.net service is provided by the CyberSource Corp. of Mountain View, Calif.

Fulfillment service 140 refers to any external service used by EDECS server 130 to fulfill a purchase order. For example, in the case of a purchase order for prints of a digital image EDECS server will transfer the digital image to the appropriate fulfillment service 140 along with a work order that includes details specifying the service or work to be performed by fulfillment service 140 such as the product to be fabricated, the quantity, the type of paper, the print size or mug size, in the case of a printed mug, and the like.

Typically, fulfillment service 140 is provided by a third party, i.e. a different company than the company that operates EDECS 100. However, fulfillment service 140 may be provided by the company that operates EDECS 100.

Depending on the type of product, fulfillment service 140 may perform processing such as transcoding of video and/or audio files into different formats or production of output files of various quality levels. For each type of product, such as prints and postcards for photos, or transcoding into different video formats, EDECS 100 may send work orders to more than one fulfillment service 140 to fulfill a purchase order.

Alternatively, a purchase order may be fulfilled directly by seller 115.

EDECS 100 may have various embodiments based on the type of products sold by seller 115. Two such embodiments are described below with reference to FIGS. 2A-C and 3. These embodiments should by no means restrict the application of the invention to other embodiments which may include any physical or digital product or service that is promoted on a website.

Embodiment 1

Selling Products Derived from Digital Media Items

In one embodiment of the invention, a website used to promote digital media items created by one or more artists is enhanced to enable buyers to purchase products derived from the digital media items or to license the digital media. The digital media promoted includes any art form that can be represented digitally on a web or blog site including inter alia images or photographs, videos, music, animation, text such as poems, speeches or other writings, and animations. In the example described with reference to FIGS. 2A-2C, a photographer, acting in this example as seller 115, uses EDECS 100 to enable visitors to seller website 125, which displays his/her photographs, to purchase products and merchandise that incorporate his/her photos. By using EDECS 100, seller 115 incorporates a complete e-commerce system into his/her website and thus eliminates the need to use a third party e-commerce hosting service or a marketplace.

This embodiment of EDECS 100 also allows seller 115 to license to buyer 105 certain rights to digital media. In this case, EDECS 100 enables buyer 105 to license digital media items directly from seller website 125. In effect, buyer 105 purchases a license to use all or part of a digital media item under the terms of the license. Rights licensed may include inter alia (1) the right to use the digital media item for specified period of time, (2) the right to use the digital media item in a specified geographic area, (3) the right to use the digital media item for a specific purpose for example for print ads or web ads.

Figure 2A:
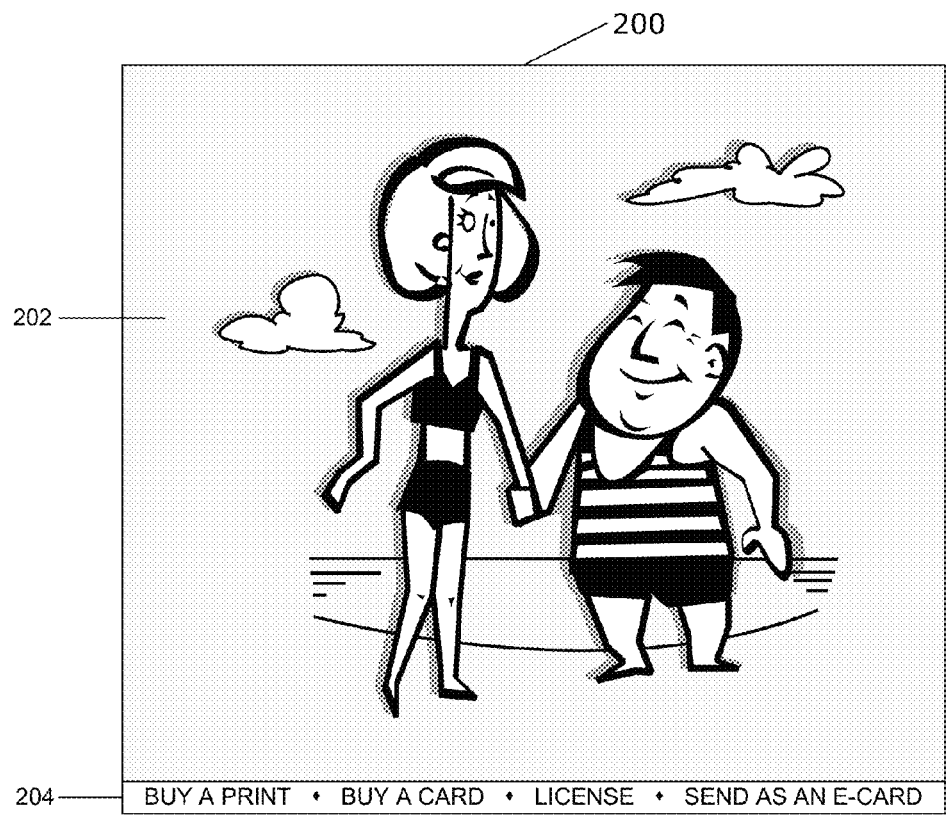
FIG. 2A is an example of a digital image in a web page with a buy and share toolbar that enables a buyer to purchase printed products based on the digital image and to send a copy of the digital image as an e-card, in accordance with an embodiment of the present invention.

Now reference is made to FIG. 2A, which is an example of a digital image in a web page with a buy and share toolbar that enables a buyer to purchase printed products based on the digital image and to send a copy of the digital image as an e-card, in accordance with an embodiment of the present invention. The web page depicted in user interface 200 displays a buy and share toolbar 204 beneath a representation of a digital image 202. Buy and share toolbar 204 is customized to sell products based on digital media and to license and share digital media. In this example, buy and share toolbar 204 offers four controls: buy a print, buy a card, license the image and send as an e-card. Generally, the term "buy and share toolbar" refers to one or more buyer-selectable controls that appear on a web page in proximity to the display version of a media item. A buy and share toolbar may be implemented as a toolbar, a drop down menu or by other user interface techniques. In addition, a buy and share toolbar may be implemented as a single control that in turn calls up a menu or list of products that the buyer can select from.

If buyer 105 selects the buy a print control on buy and share toolbar 204, then a user interface 210, described with reference to FIG. 2B, appears. If buyer 105 selects the buy a card control then a user interface 230, described with reference to FIG. 2C, appears. If buyer 105 selects a control to license the image then a user interface, not depicted, appears. If buyer 105 selects a control to send an e-card then a user interface, not depicted, appears. Additional products can be added with only slight modification to buy and share toolbar 204. It may be appreciated by one skilled in the art that with this approach new products may be flexibly added. Specifically, when a new product is added, a new control is added to buy and share toolbar 204 that enables buyer 105 to initiate the purchase of the new product and a corresponding user interface is provided by EDECS server 130 when buyer 105 selects the new control.

Figure 2B:
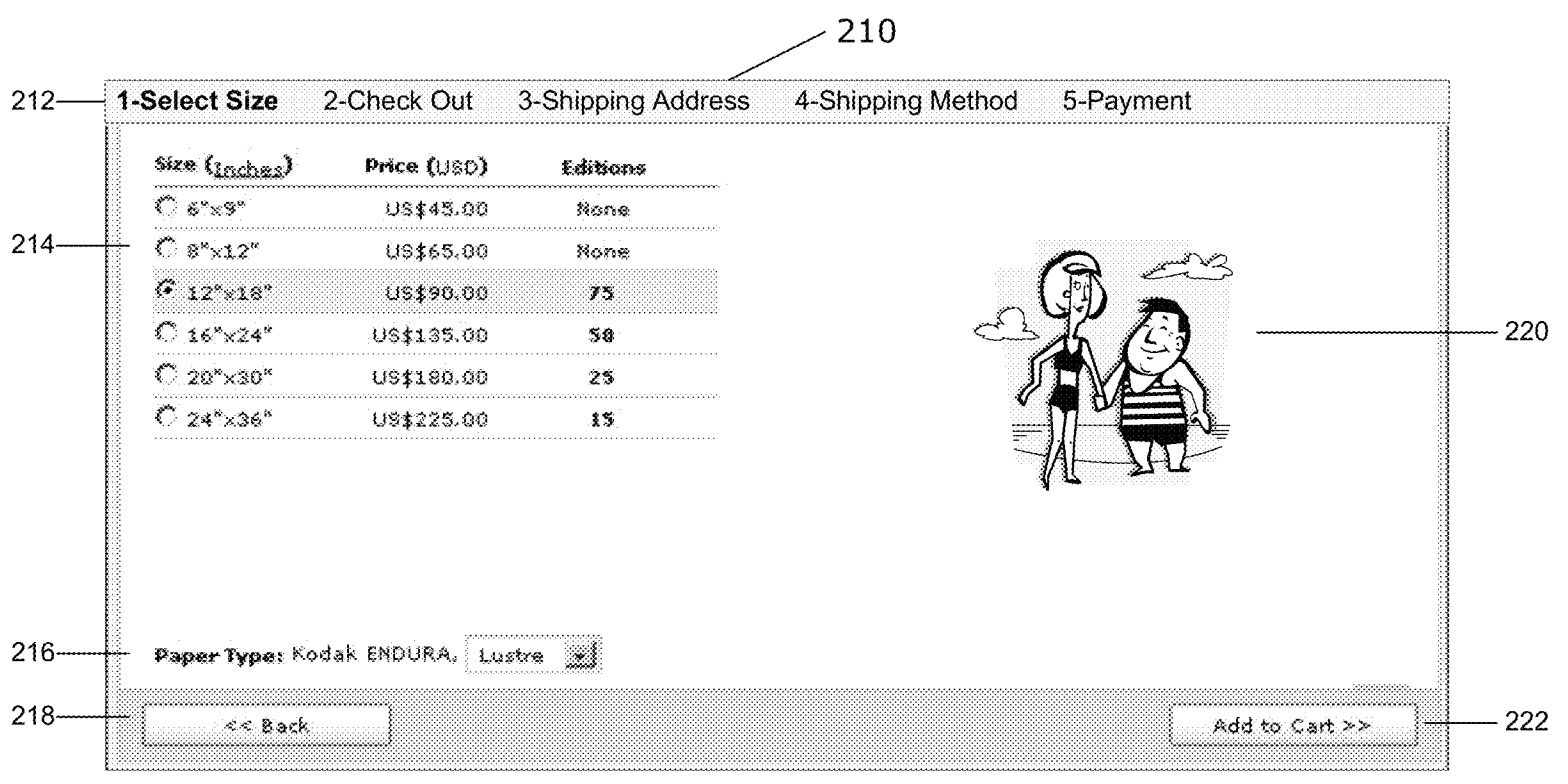

Now reference is made to FIG. 2B, which is an example of a user interface that enables a buyer to specify various options of a print order, in accordance with an embodiment of the present invention. User interface 210 is provided by EDECS server 130 when buyer 105 selects the buy a print control from buy and share toolbar 204, as described with reference to FIG. 2A. A processing step control 212 indicates the current step being performed in the five step ordering process. In this example, the five steps are (1) select a size for the print, (2) check out, (3) provide a shipping address, (4) select a shipping method, and (5) make an electronic payment. One unique aspect of EDECS 100 is that the steps are performed without buyer 105 having to leave seller website 125.

A size control 214 enables buyer 105 to select a size for the printed image from a list of print sizes. A small version 220 of the image to be printed is displayed. A paper type control 216 enables buyer 105 to select a paper type. Two controls, a back control 218 and an add to cart control 222 allow the user to move backwards and forwards through the five steps in the process.

Figure 2C:
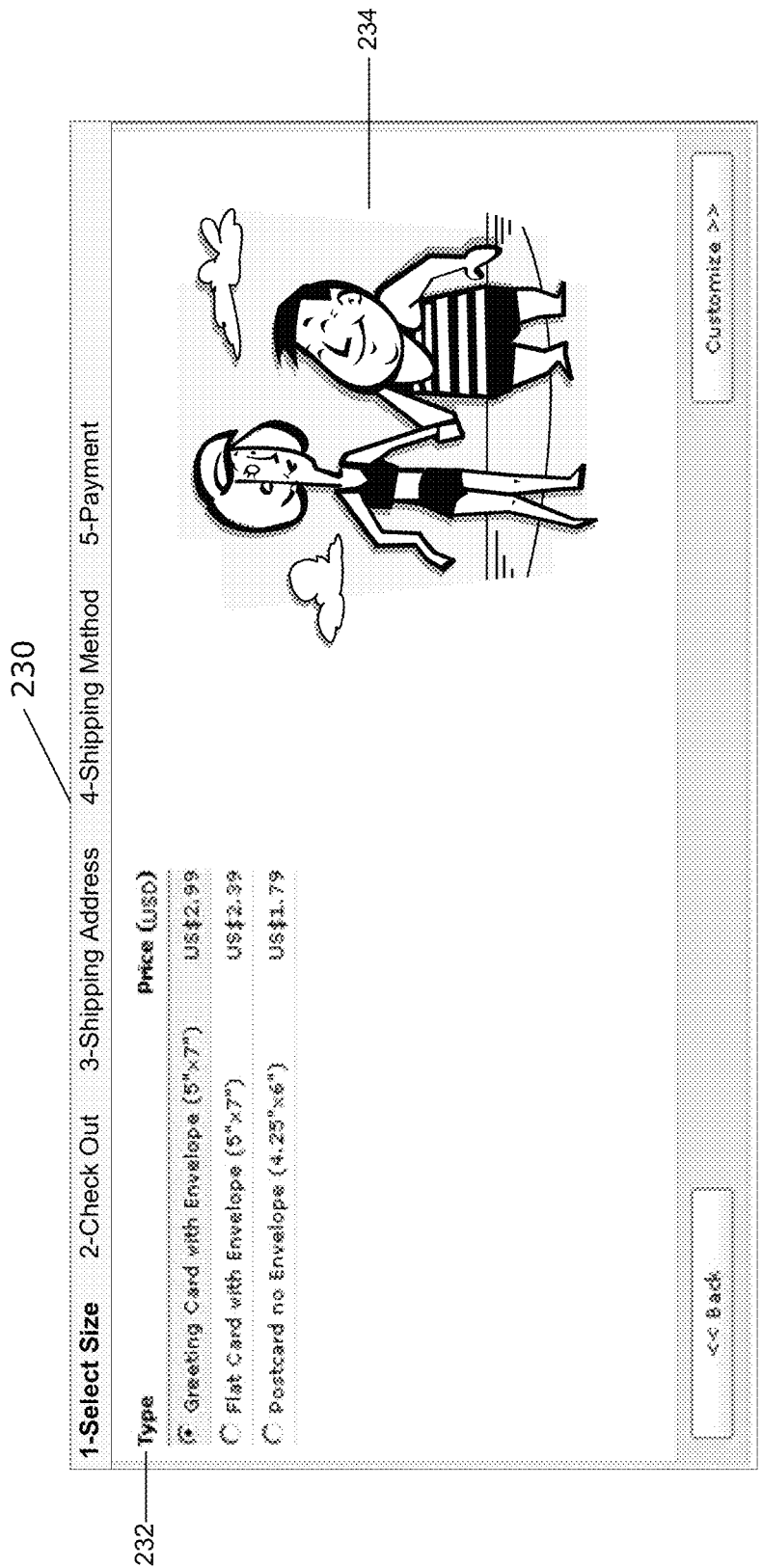
FIG. 2C is an example user interface, in accordance with an embodiment of the present invention.

Now reference is made to FIG. 2C, which is an example of a user interface that enables a buyer to specify options for a printed card, in accordance with an embodiment of the present invention. User interface 230 is provided by EDECS server 130 when buyer 105 selects the buy a card control from buy and share toolbar 204, described with reference to FIG. 2A. Buyer 105 selects a type of card size a list of types of card 232. A preview of the card 234 is displayed.

Embodiment 2

Selling Products

In a second embodiment of the invention, a seller's website that promotes various creations is enhanced to enable buyers to purchase the creation represented by digital media items, typically in the form of digital images, although not limited as such, that appear on the website. The creations, or products, promoted include any physical product or service that can be represented using digital media such as, digital images, digital videos, or text, on a web or blog site including inter alia items of art and craft, books, records, automobiles, games, and tools. In the example described with reference to FIG. 3A, a jeweler, acting in this example as seller 115, uses EDECS 100 to sell jewelry directly from his/her website, seller website 125. By using EDECS 100, seller 115 incorporates a complete e-commerce system into his/her website and thus eliminates any need for a third party e-commerce hosting service a marketplace.

When seller 115 uses the invention in conjunction with seller website 125, visitors to seller website 125 may (1) select products depicted on website 125 for purchase, specify sizes and other product options, add the products to a shopping cart, (2) see the total price, shipping options and shipping costs, and (3) make electronic payments. Upon receiving a purchase order, EDECS 100 electronically notifies seller 115 of the purchase order. Typically, notification is performed by email and the email message includes information about the product and the buyer.

Figure 6:
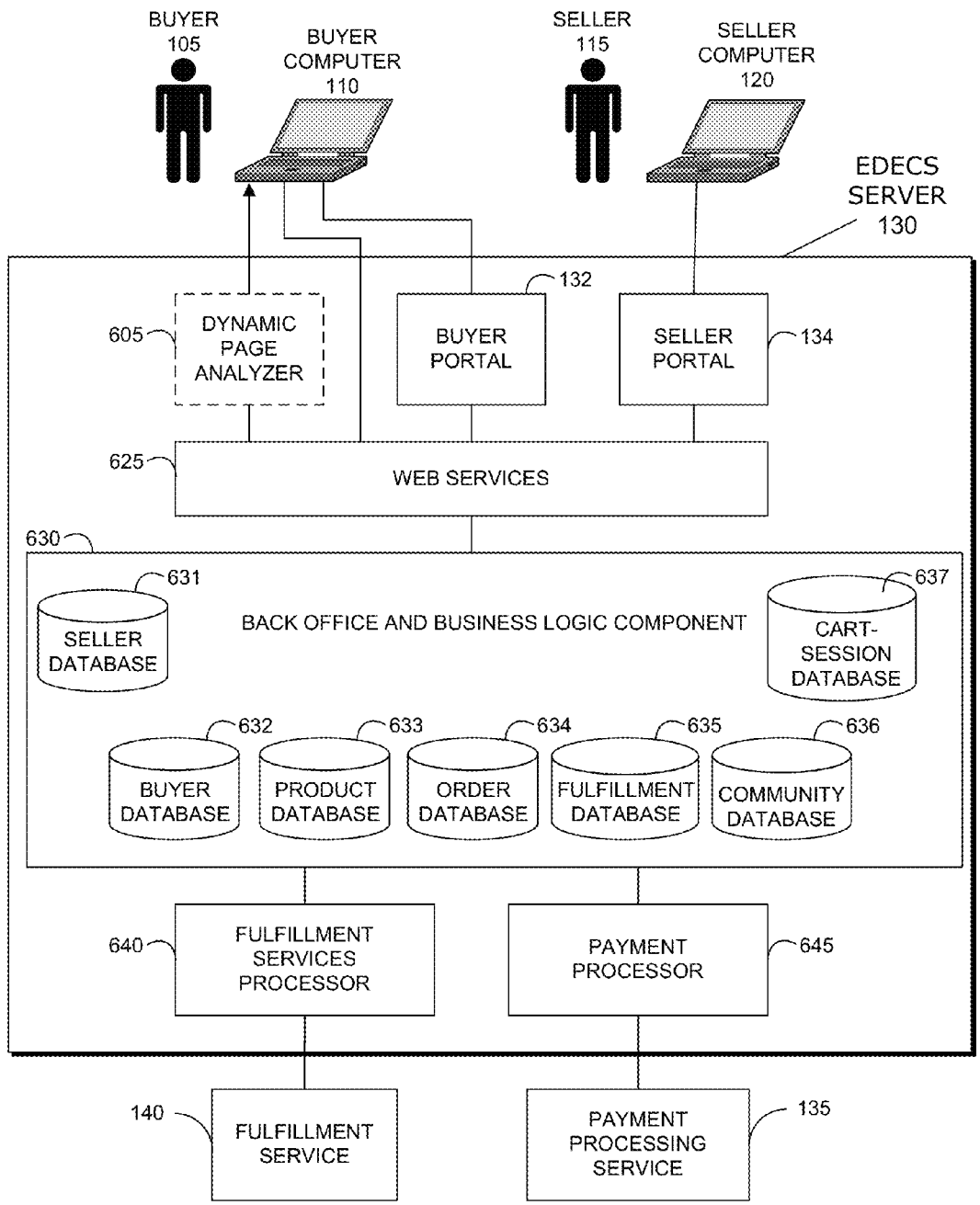
FIG. 6 is a high level block diagram of the software components of an embeddable distributed e-commerce and community building system (EDECS) server, in accordance with an embodiment of the present invention.

The method performed by buyer 105 when using EDECS 100 to purchase products derived from digital media, is similar to the method used in the current embodiment, purchasing ordinary products. However, the method for fulfilling the purchase, discussed in detail below with reference to FIG. 6, is different.

Figure 3:
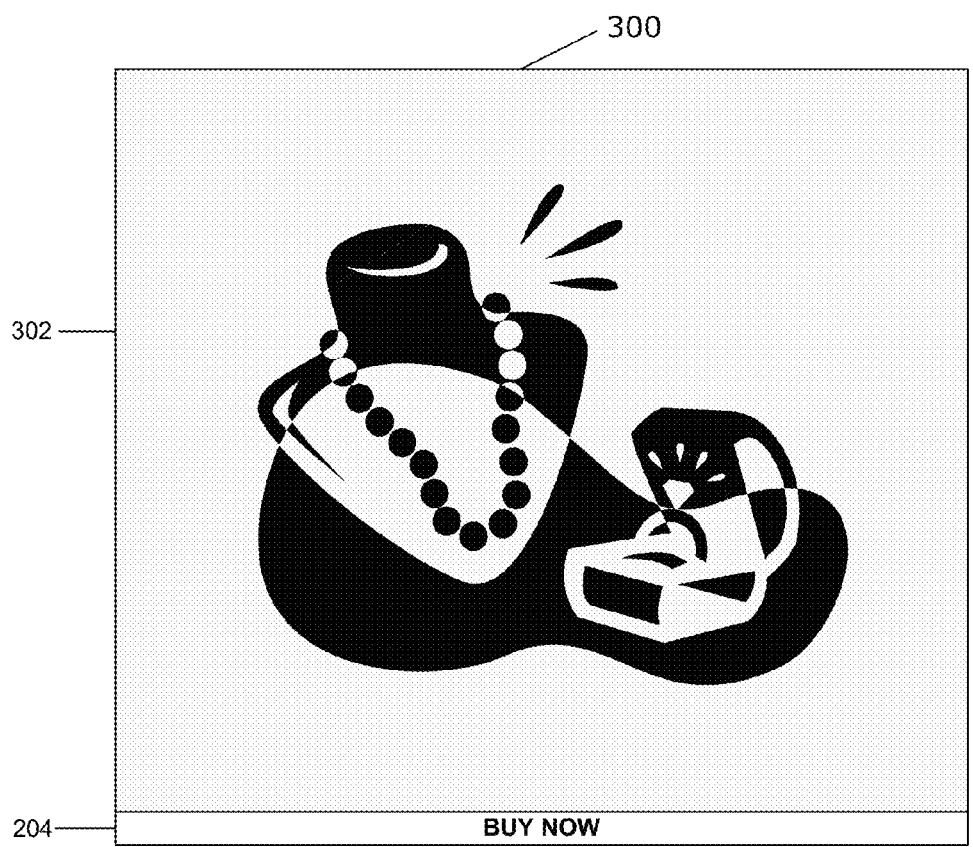
FIG. 3 is an example of an image of a product in a web page with a buy and share toolbar that enables a buyer to purchase the pictured product, in accordance with an embodiment of the present invention.

Now reference is made to FIG. 3, which is an example of an image of a product in a web page with a buy and share toolbar that enables a buyer to purchase the pictured product, in accordance with an embodiment of the present invention. The web page depicted in user interface 300 displays buy and share toolbar 204 beneath a digital image 302. In this example, buy and share toolbar 204 offers a single buy now control.

If buyer 105 selects the buy now control, using buy and share toolbar 204, then a user interface, not depicted, is provided by EDECS server 130 that enables the user to specify any product characteristics such as sizes, colors and prices. Such characteristics are configured by seller 115 using seller portal 132, described with reference to FIGS. 4A-4C.

Figure 4A:
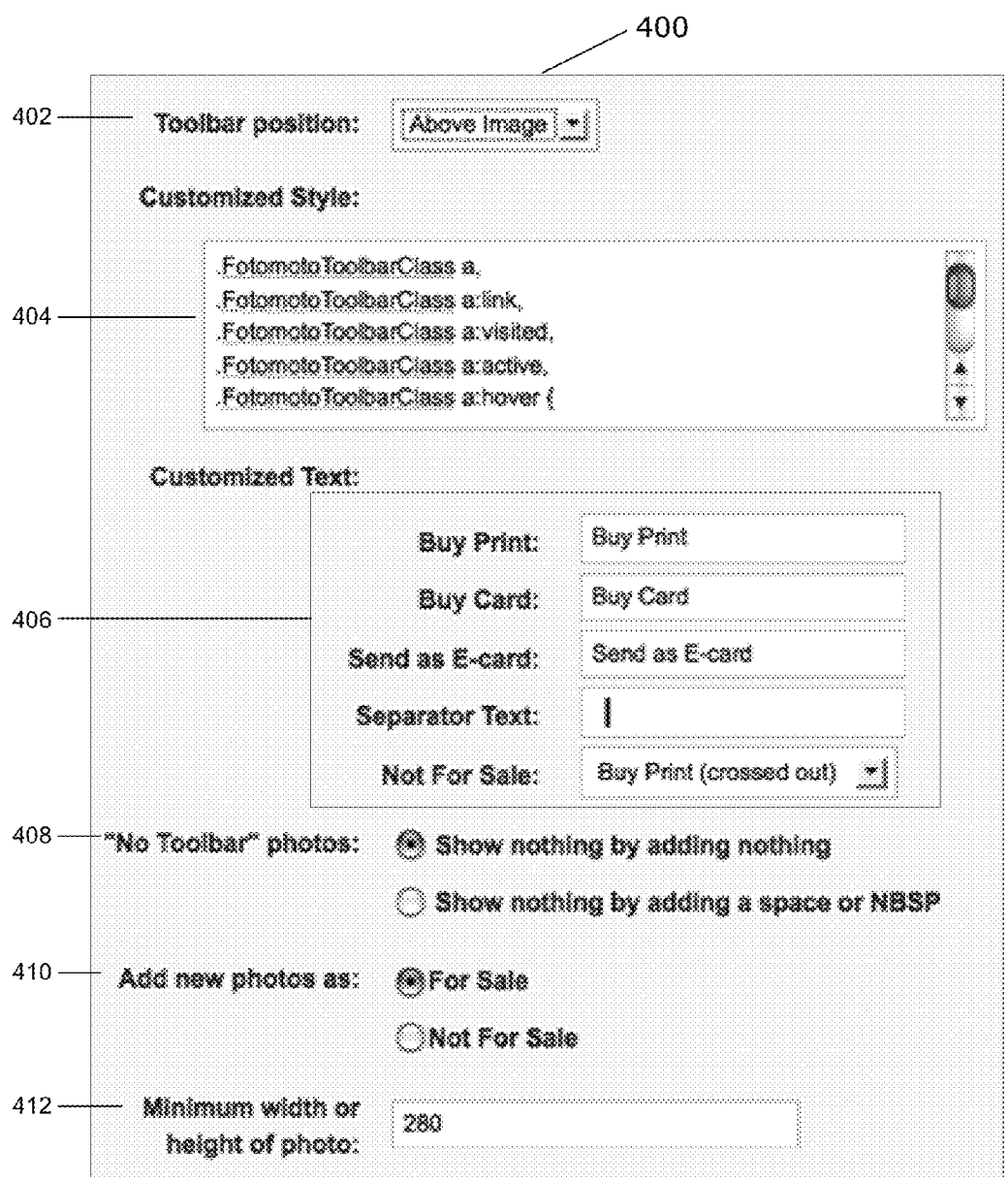
FIG. 4A is an example user interface for a seller portal that enables a seller to customize a buy and share toolbar, in accordance with an embodiment of the present invention.

Now reference is made to FIG. 4A, which is an example user interface 400 for a seller portal that enables a seller to customize a buy and share toolbar, in accordance with an embodiment of the present invention.

A toolbar position control 402 enables seller 115 to select between different possible locations for buy and share toolbar 204 relative to the image. In one embodiment the alternative positions are above the image and below the image.

A customize style entry box 404 enables seller 115 to add HTML cascading style sheet (CSS) code that will control the visual characteristics, including color and fonts, of buy and share toolbar 204.

A group of customized text controls 406 enables seller 115 to change the text displays on buy and share toolbar 204 for each control and for the separator character that appears between controls. Group of customized text controls 406 includes a control that enables seller 115 to specify how to display a control that corresponds to a product, e.g. a print, that is not for sale.

A no toolbar control 408 enables seller 115 to specify what visual element if any should be displayed in the event that no buy and share toolbar 204 is displayed.

An add new photos control 410 enables seller 115 to specify the default setting when new photos are added. In the embodiment depicted in user interface 400, the possible default settings are for sale and not for sale.

A minimum size control 412 enables seller 115 to specify that images with a width or height less than a certain size do not meet a minimum size requirement and no buy and share toolbar 204 should be displayed.

Figure 4B:
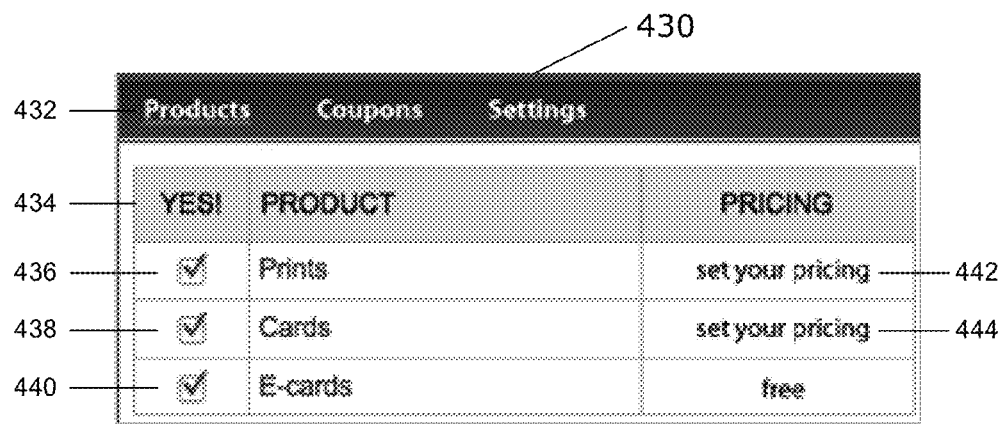
FIG. 4B is an example user interface for a seller portal that enables a seller to select the products to be sold, in accordance with an embodiment of the present invention.

Now reference is made to FIG. 4B, which is an example user interface 430 for a seller portal that enables a seller to select the products to be sold, in accordance with an embodiment of the present invention. Seller portal 134 provides user interface 430 to seller 115 to enable him/her to select products to be sold using buy and share toolbar 204 and to establish pricing for the selected products. A product table 434 lists each control that can be added to buy and share toolbar 204. A print control 436 enables seller 115 to specify whether a print control should be added to buy and share toolbar 204. Similarly, a card control 438 enables seller 115 to specify whether a card control should be added to buy and share toolbar 204. Finally, an e-cards control 440 enables seller 115 to specify whether an e-card control should be added to buy and share toolbar 204. Seller 115 uses a set print pricing control 442 to specify pricing for prints and a set card pricing control 444 to specify pricing for cards. For each control in product table 434 that is selected, a visual control will appear on buy and share toolbar 204. For example, if seller 115 uses print control 436 to specify that he/she wants to offer prints, then a visible print control will be displayed on buy and share toolbar 204.

Now reference is made to FIG. 4C, which is an example user interface 450 for a seller portal that enables a seller to specify the price for a product, in accordance with an embodiment of the present invention. User interface 450 displays a table of print sizes and prices 452 that includes a row for each differently priced set of print sizes. Each row includes a control, a "+" sign in user interface 450, that enables seller 115 to expand the row to show additional sizes. For each print size seller 115 wishes to offer, he/she selects the offered checkbox for the row and selects one size in the row.

Figure 5A:
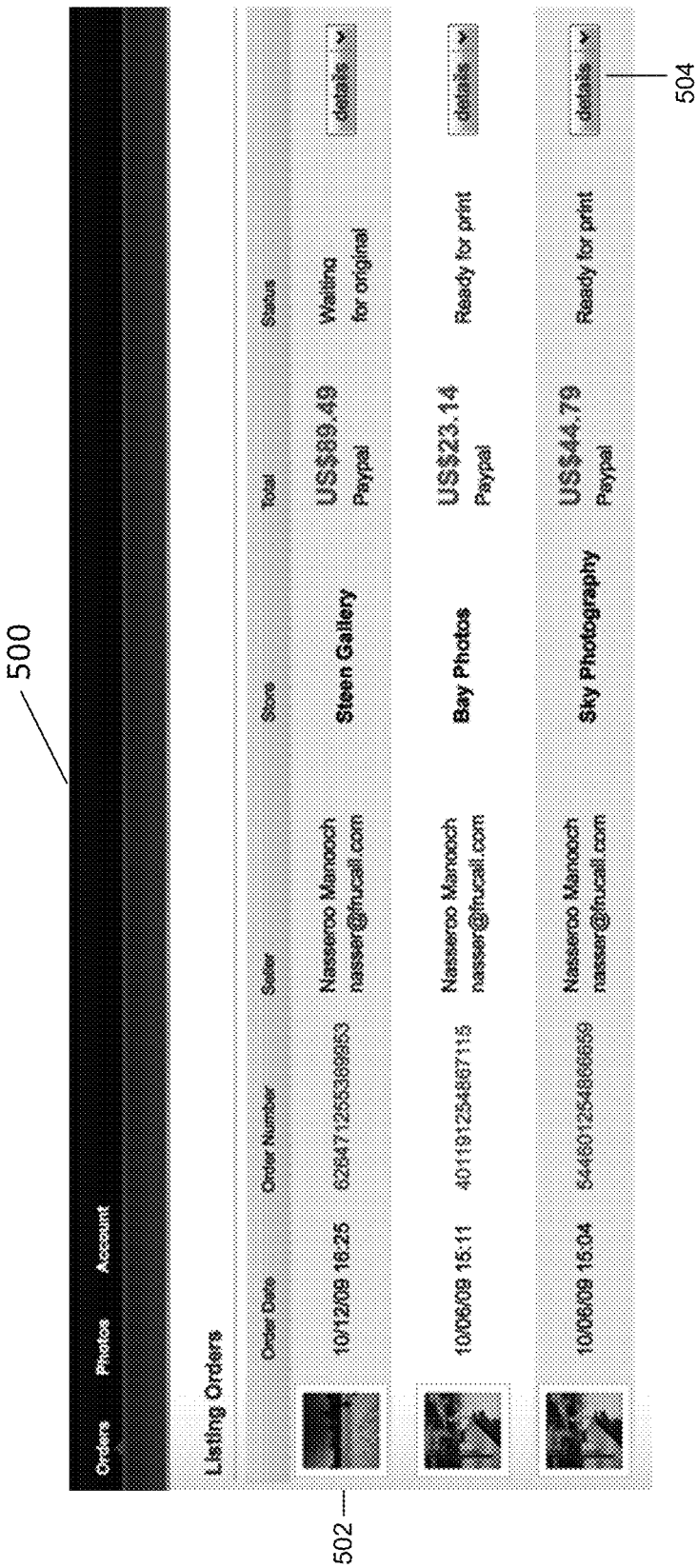
FIG. 5A is an example user interface for a buyer portal that enables a buyer to view a list of purchase orders he/she has placed, in accordance with an embodiment of the present invention.

Now reference is made to FIG. 5A, which is an example user interface 500 for a buyer portal that enables a buyer to view a list of purchase orders he/she has placed, in accordance with an embodiment of the present invention. User interface 500, provided by buyer portal 132, displays a list of purchase orders that buyer 105 has previously placed at sellers' websites that participate in EDECS 100. Each row 502 in the list of purchase orders includes the following information: a thumbnail that depicts the digital media item or product purchased, the date the purchase order was made, a unique purchase order number, the seller name and email address, the store, i.e. seller, at which buyer 105 purchased the item, the total price paid and the method of payment used and the current status of the purchase order. Also, each row includes a details control 504. When buyer 105 selects details control 504, buyer portal 132 provides to the web browser running in buyer computer 110 additional details about the corresponding purchase order for display to buyer 105. The additional details include the name of buyer 105 and the shipping address for the purchase order, information about seller 115 including his/her name and website address, the amount of the purchase order, shipping details and a description of any product options selected.

Figure 5B:
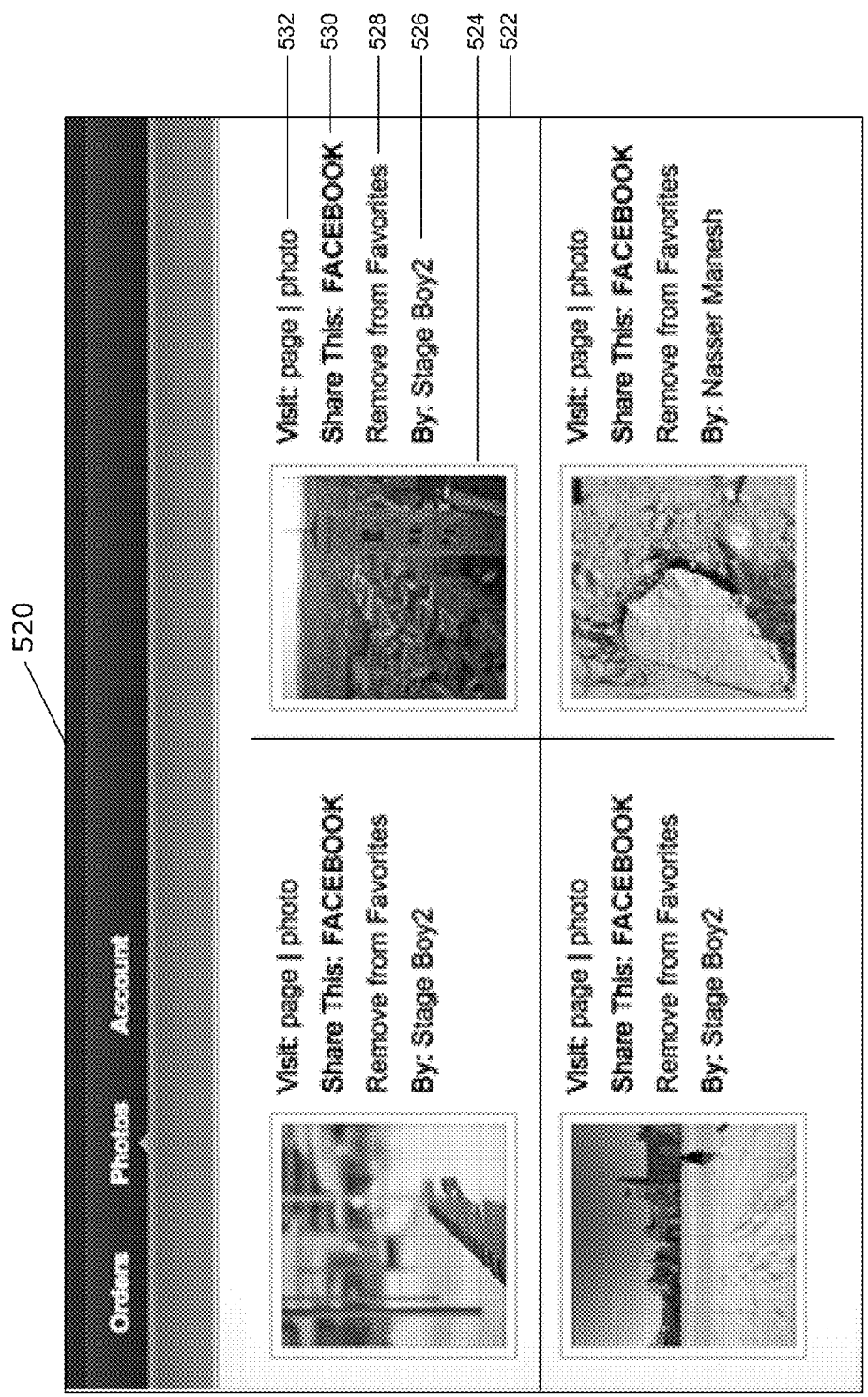
FIG. 5B is an example user interface for a favorite photos web page in a buyer portal that enables a buyer to visit, share and remove favorite photos, in accordance with an embodiment of the present invention.

Now reference is made to FIG. 5B, which is an example user interface 520 for a favorite photos web page in a buyer portal that enables a buyer to visit, share and remove favorite photos, in accordance with an embodiment of the present invention. Buyer portal 132 enables buyer 105 to view all photos that buyer 105 selected as a favorite photo when browsing web pages provided by seller website 125. User interface 520 includes a favorite photo panel 522 for each favorite photo selected by buyer 105. Favorite photo panel 522 includes an image thumbnail 524 of a favorite image, the name of the photographer 526 that took the photo. In addition, favorite photo panel 522 includes three controls: a remove from favorites control 528, a share this control 530, and a visit control 532. When buyer 105 selects remove from favorites control 528 the photo is deleted as a favorite photo. Buyer 105 uses share this control 530 to insert a link to the photo in one of his/her social network accounts. In the example presented in FIG. 5B, the FACEBOOK social network is shown. In this case, the FACEBOOK API would be used to add a link to the photo in the FACEBOOK account of buyer 105. FACEBOOK is a social network website that enables independent application developers to use a published API to use FACEBOOK services such as posting a link. FACEBOOK is provided by FACEBOOK Inc. of Palo Alto, Calif. Buyer 105 uses visit control 532 to specify whether the photo or the web page containing the photo should be displayed when buyer 105 clicks on image thumbnail 524.

Now reference is made to FIG. 6, which is a high level block diagram of the software components of an embeddable distributed e-commerce and community building system (EDECS) server 130, in accordance with an embodiment of the present invention. EDECS server 130 uses a set of web services 625 to communicate with buyer computer 110, seller computer 120, payment processing service 135 and fulfillment service 140. In general, to use the services provided by EDECS server 130, the web browser running inside buyer computer 110 or seller computer 120 issues a request for service message using the hypertext transfer protocol (HTTP) to web services 625. Web services 625 receives the HTTP request and invokes the appropriate server software module in EDECS server 130 to process the request. Web services 625 may include a commercially available application server that includes a web server that accepts and processes HTTP requests from the web browser and serves or transmits HTTP responses back to the web browser along with optional data contents, which usually are web pages in HTML format and linked objects (images, or the like). Henceforth, the term request message refers to a message sent by a web browser using HTTP or another client-server communications method to web services 625. A response message refers to a message sent in response, typically using the same communications method, by web services 625 to the web browser.

As previously mentioned, to use EDECS 100 to provide e-commerce services for a creation, seller 115 adds a client-side script referred to herein as a widget embedding script to a web page on seller website 125 that displays the creation. When the web browser running in buyer computer 110 executes the widget embedding script it issues an HTTP request to EDECS server 130 to provide a dynamic page analyzer 605. In response, EDECS server 130 sends an HTTP response message that includes another client-side script referred to herein as a dynamic page analyzer 605 for execution by the buyer's web browser. So, while dynamic page analyzer 605 resides on EDECS server 130, it is sent to and executed by the web browser running on buyer computer 110. Seller portal 134 provides the widget embedding script to seller 115 when he/she registers with EDECS 100.

Dynamic page analyzer 605 analyzes a web page and determines where on the web page to add an instance of buy and share toolbar 204. Multiple instances of buy and share toolbar 204 may be added to a single web page. Dynamic page analyzer 605 generates the web page code, including HTML and any client-side scripting code required, to display each buy and share toolbar 204 that it adds to a web page. Both the widget embedding script and dynamic page analyzer 605 are further discussed with reference to FIG. 7.

As previously discussed, buy and share toolbar 204 provides controls that enable buyer 105 to purchase, license, share or obtain a printed version of the creation being viewed. When buyer 105 selects a control from buy and share toolbar 204, buyer computer 110 creates and sends an HTTP message to EDECS server 130 requesting a dynamic cart. EDECS server 130 in response sends a HTTP response message that includes a dynamic cart, which is client-side script that when executed by a web browser creates an interactive shopping cart appropriate to the product selected for purchase within the currently displayed web page.

The dynamic cart, when executed by the web browser running in buyer computer 110, first adds an HTML DIV element to the DOM of the current web page causes a window to display on the screen. The dynamic cart uses the parameters supplied as a result of buyer 105 selecting a control from buy and share toolbar 204, to fetch from EDECS server 130 the client-side script and HTML content required to provide the specific dynamic cart features appropriate to the product selected by buyer 105. The dynamic cart provides the visual and interactive elements that enable buyer 105 to specify product options, place purchase orders, and make payments while staying within the same web page on seller website 125.

The dynamic cart communicates with a back office and business logic component 630 which performs order processing, payment processing via a payment processor 645, bidding and auction processing, escrow processing, and fulfillment via a fulfillment services processor 640. Back office and business logic component 630 also stores and maintains a number of databases including a seller database 631, a buyer database 632, a product database 633, an order database 634, a fulfillment database 435, a community database 436, and a cart session database 637.

Seller database 631 stores information about the sellers whose creations are sold via seller website 125. The information includes: a unique seller ID, the URL of seller website 125, a site key which is a unique string generated by EDECS server 130 to identify the seller website 125, any customization seller 115 makes to his/her dynamic page analyzer script using seller portal 134, the seller's preferred method of receiving their sales proceeds such as mailing checks, direct bank transfer, or online payment service such as PAYPAL, as well as information required to perform the method such as mailing address for checks, bank account number for direct transfer, or PAYPAL account for PAYPAL money transfer.

Buyer database 632 stores information about each buyer 105 that visits a seller website, including a unique buyer identifier (ID), a shipping address, and a preferred payment method.

Product database 633 stores information about products sold on seller website 125. This includes a unique product ID, available options, and prices set by seller 115 using seller portal 134.

Order database 634 stores information about each purchase order processed by EDECS 100. Every record in this database represents a purchase order, i.e. an instance of a buyer "checking out" items from an electronic shopping cart. The purchase order includes inter alia a unique order ID and information about the purchase order including the date and time the purchase order was made, current fulfillment status, payment status, and a list of product IDs that include one product ID for each product in the purchase order.

Fulfillment database 635 stores information about different fulfillment services that EDECS server 130 may use to fulfill a purchase order. Each record describes a fulfillment service and includes a unique fulfillment service id, information describing how to electronically interact with the fulfillment service to use services provided by the fulfillment service, and the products or type of products that the fulfillment service can fulfill. The term fulfillment, as used herein, refers inter alia to the manufacturing steps of fabrication, assembly, packaging and shipping, i.e. all the steps required to manufacture a product and ship it to a recipient. Upon receiving a purchase order EDECS server 130 looks up the products buyer 105 purchased in product database 633, matches that against the types of products represented in fulfillment database 635, and determines which fulfillment service(s) to submit a work order to.

Community database 636 stores buyer behavior information including inter alia the level of interest buyers show in items by purchasing them, making them favorite, rating them, etc.

Any seller website 125 that adds the widget embedding script participates in EDECS 100. Buyer 105 may visit any website participating in EDECS 100 and add an item to their shopping cart. Therefore, if buyer 105 visits a website participating in EDECS 100 and then visits another website participating in EDECS 100 he/she can use the same sign-in information, access the same dynamic cart, and add items or otherwise make changes to the same dynamic cart. Thus, it is possible for buyer 105 to select items from different, independent, websites, each participating in EDECS 100, and to check out, or pay, for all items in the dynamic cart at one time. In order to do this, back office and business logic component 630 stores a "cart session" object for buyer 105 in cart session database 637. Each cart session object includes two sub-objects: a session object, which includes information about the type of browser on buyer computer 110 identifies the buyer 105, and a cart-item object that identifies each item in the dynamic cart. Each cart-item object includes a unique product id, a specification of any product options, such as such as size and paper type, the URL of the seller website 125 the item appears on, and its price. As buyer 105 moves from one web page to the other and adds items to his/her dynamic cart, the dynamic cart makes HTTP requests to EDECS server 130 to add the item to the cart session for buyer 105. Similarly, if buyer 105 removes an item or changes the selected options of an item using the dynamic cart, the dynamic cart sends an HTTP request to EDECS server 130 to modify the cart-session object stored in cart session database 637.

Back office and business logic component 630 receives, analyzes and processes purchase orders received by web services 625 from the web browser running in buyer computer 110. Back office and business logic component 630 analyzes a purchase order to determine which fulfillment service(s) 140 should handle the purchase order. It then uses fulfillment services processor 640 to send work orders to each fulfillment service 140.

The fulfillment service required to fulfill a purchase order depends on the type of product ordered. For example, seller 115 may specify that a digital photo being sold on seller website 125 can be purchased in a variety of formats, including inter alia various sizes of prints, a framed printed image, an image printed on a mug or t-shirt or greeting card. Each such format, size, or packaging of a creation is represented as a separate stock keeping unit (SKU) and each SKU may be fulfilled by a different fulfillment service 140.

One purchase order received by EDECS server 130 may result in a plurality of work orders being generated and submitted to a plurality of fulfillment services 140. For example, a single purchase order placed by buyer 105 may include multiple products such as (1) a poster print of a photo from an artist's blog, (2) a framed print of a digital image, (3) a t-shirt with a printed version of the image, and (4) a mug also including a printed version of the same image. EDECS server 130 uses information from fulfillment database 635 to determine which fulfillment service can make a poster print, which can print on a t-shirt, and which can print on a mug. EDECS server 130 will also check to see which fulfillment service 140 provides the type of frame that buyer 105 requested. Once each fulfillment service 140 is identified, EDECS server 130 obtains from fulfillment database 635 the information necessary to interact with each fulfillment service 140 and submits a work order to each of them. In this example, a single purchase order results in up to four separate work orders placed with four different fulfillment services 140.

As previously discussed, the company that operates EDECS 100 may provide certain fulfillment services. Other fulfillment services may be provided by independent (third party) companies.

Back office and business logic component 630 tracks each work order to completion. For example, if buyer 105 orders a framed print of a digital image, back office and business logic component 630 first uses fulfillment services processor 640 to send the digital image file to an appropriate fulfillment service 140, and then directs that the printed image be shipped to a framer and provides the necessary description of the frame and shipping address. Some of the steps or work orders may be done manually while others may be done in a fully automated fashion via web services call between online services. However buyer 105 is not exposed to any of these manual or automated steps; he/she only sees a completed product.

When a product included in a purchase order is derived from a media item such as a photograph, a video or sound, back office and business logic component 630 will typically send a request to seller 115 to provide a digital version of the media item. The digital media item is then included in the work order sent to fulfillment service 140. Alternatively, seller 115 may maintain online a repository of digital media elements and enable back office and business logic component 630 to fetch the digital media item when it is needed to fulfill a purchase order as described hereinbelow with reference to the auto pick-up capability.

The architecture of EDECS server 130 is independent of the physical storage technology. Thus, EDECS server 130 can work with a variety of physical storage and database management technologies including inter alia cloud storage, network access storage (NAS), Storage Attached Network (SAN), central server, replicated servers, and distributed servers.

Fulfillment services processor 640 communicates with each third-party fulfillment service 140 as necessary to fulfill a purchase order. In general, each fulfillment service 140 specifies a communications interface that must be supported by fulfillment services processor 640. Fulfillment services processor 640 thus supports several communications interface methods, referred to as APIs, including a web service using HTTP, file transfer using FTP, and email. The content of a communication between fulfillment services processor 640 and fulfillment service 140 typically has two parts: the digital media content item to be used to make the ordered product, e.g. a digital photo, digital video or music clip, and or video, or music, and specification of the product to be made, including the product id and any options. The product specification is typically in an XML format or in the form of key/value pairs. It includes product option information such as size, paper type, shipping method, shipping address and shipping information.

As previously mentioned, the method performed by buyer 105 when using EDECS 100 to purchase products derived from digital media (first embodiment of the subject invention) is the same when using EDECS 100 to purchase ordinary products (second embodiment of the subject invention). However, the method for fulfilling a purchase is different. In the first embodiment fulfillment service 140 is required to complete and fulfill the purchase order. EDECS 100 looks up the product by buyer 105, e.g. a print, postcard, or license, in fulfillment database 635 to determine which fulfillment service 140 to use to fulfill the purchase order. Fulfillment services processor 640 uses an API provided by fulfillment service 140, to send a work order to fulfillment service 140 along with the digital media files and control information required to process the work order. For example, if buyer 105 selects a canvas print, EDECS 100 selects a fulfillment service 140 that is capable of printing on canvas and sends an XML file containing the purchase order information including, size, options, and shipping address information, along with the digital image file that is to be printed. Fulfillment service 140 then performs all aspects of the fulfillment process, including printing the photo on the right media and shipping it to buyer 105.

In the second embodiment, the product is fulfilled directly by seller 115. In this case, fulfillment processor 640 sends a work order by email to the seller including the product ID, shipping address and shipping method. Seller 115 is responsible for packaging and shipping the product.

Payment processor 645 interfaces with a number of payment services including credit card processing services and online payment services such as PAYPAL. Online payment services hide the credit card or financial details supplied by buyer 105. Each such online payment service provides a communications method, referred to as an application programming interface (API), that is used to send the required method of payment information including the purchase order amount, tax amount, shipping amount, and list of purchased items. In this approach, the web browser used by buyer 105 is redirected to a web page on a website provided by the online payment service. Buyer 105 logs into his/her account with the online payment service and is presented with a bill that shows the items, purchase order amount, tax amount, shipping amount, and finally a total. Buyer 105 interacts with the online payment service to make the payment and then the web browser is redirected back to seller website 125. With this approach, EDECS server 130 does not store any method of payment information from buyer 105. Payment processor 635 encapsulates the information described above into an XML formatted request message based on the API specification of the online payment service, and submits it to the online payment service via a web service call. The online payment service sends the result and status of the payment back to payment processor 635 via an XML formatted response message.

EDECS server 130 uses web services 625 to provide seller portal 134. Seller portal 134 enables seller 115 using seller computer 120 to access data from the databases stored by back office and business logic component 630. Seller portal 134 enables seller 115 to register with EDECS 100, customize his/her settings, view outstanding purchase orders and obtain a widget embedding script. Seller 115 can obtain various lists by logging into the seller portal 134, including a list of buyers that have purchased seller 115 products, a list of buyers that have shown interest in seller 115 products, and a list of buyers did not indicate interest in seller 115 products. Buyers that have previously purchased products from seller 115 and buyers that have visited seller website 125 and expressed interest in products from seller 115 are referred to herein as "community members."

Seller portal 134 also provides mailing lists and email tools to seller 115 that enable seller 115 to contact community members using email. Seller portal 134 provides an authoring tool to write an email and to attach photos or web page links, and also enables seller 115 to select the email recipients. For example, seller 115 could use the mailing list to invite community members to visit seller website 125 to see his/her new creations, or to inform community members about an upcoming event or exhibition.

Using seller portal 134, seller 115 may flexibly change, update and reconfigure the various products that he/she sells via seller website 125. Seller 115 may add new products and product options at any time and existing products and product options may be deleted at any time. Every time a dynamic cart executes it checks the latest capabilities and services and offers them to buyer 105 accordingly. Deleted choices are automatically removed; thus, deleted choices are not included in the dynamic cart and buyer 105 does not see them.

EDECS server uses web services 625 to provide a buyer portal 132 that enables buyer 105 to log in and track his/her purchase orders. Buyer portal 132 also acts as a public website that enables visitors and potential buyers to browse, search for, and purchase creations from the various blogs and websites served by EDECS 100. In this regard, buyer portal 132 maintains a catalog of creations served by EDECS 100 and enables buyer 105 to (1) view sorted lists of creations based on inter alia sales rank and popularity, (2) search the catalog using inter alia keywords, and (3) navigate the catalog using inter alia sellers' names and sellers' website names to find certain items. Selecting a creation name, a seller's name, or a seller website name causes the web browser running in buyer computer 110 to redirect to seller website 125.

Seller portal 134 enables seller 115 to create an account with EDECS 100 by going through a registration process. The registration process enables seller 115 to provide a unique username and password, his/her contact information and method payment information that enables EDECS 100 to make electronic payments to seller 115 for his/her share of the proceeds for sales of his/her creations or for sales of products based on his/her commissions. The portion of each sale to be paid to seller 115 is specified in a seller agreement that is agreed to during the registration process.

Seller portal 105 uses back office and business logic component 630 to store seller information in seller database 631, including the information provided by seller 115 during the registration process, a URL for seller website 125, and to assign and store a unique seller ID, referred to as a site key, for each new seller 115. Seller portal 620 provides seller 115 a web page where he/she can pick colors, fonts, and other elements of style for the buy and share toolbar, and generates a widget embedding script for seller website 125. Seller portal 134 offers an option to automatically pick a style. To automatically generate a style, seller portal 134 crawls seller website 125 and extracts information about the visual style of the website from its in-line styles such as font and color definitions or its Cascading Style Sheet (CSS) files. Thus, EDECS 100 enables seller 115 to add e-commerce without changing the overall style of seller website 125. As described with reference to FIG. 4A, seller portal 134 enables seller 115 to configure rules that are then used by dynamic page analyzer 605 to identify the items for sale on a web pages.

Widget Embedding Script

EDECS seller portal 134 generates a widget embedding script specific to seller website 125. The widget embedding script typically consists of several lines of JAVASCRIPT. Seller 115 obtains the widget embedding script from EDECS seller portal 134 and inserts it into the HTML code of seller website 125 in a way that the widget embedding script is added to every web page on seller website 125 that displays a creation and offers e-commerce services.

There are many methods by which seller 115 may add the widget embedding script to his/her seller website 125. Although such methods are outside the scope of the invention several common methods are described below.

In a first method, seller 115 using opens the page or pages of seller website 125 that display items for sale, and copies and pastes the widget embedding script into those pages. The text can be added anywhere on the page as long as it is outside of other scripts, and it does not break the HTML syntax of the page. The best practice is to add the text closer to the bottom of the page, before the HTML </BODY> tag. Typically, seller 115 uses a text editor or a web page editing program to insert the.

In a second method, if seller website 125 uses a template in such a way that a common file is included in various pages of the site, for example a file that generates the footer for all of the pages of the site, then seller 115 adds the widget embedding script to such file. The result is that the widget embedding script is automatically included in all web pages that use the common file. The text can be added anywhere in such common file as long as it is outside of other scripts, and it does not break the HTML syntax of the page.

In a third method, an EDECS plugin or add-on may be created and used with certain publishing or content management system (CMS) platforms. Such an EDECS plugin or add-on would insert the widget embedding script into the proper locations in a websites managed by the publishing or CMS platform. Publishing or CMS platforms support plugins or add-ons include Wordpress, PixelPost, MovableType, Joomla, and Drupal. An EDECS plugin for any of these platforms simply provides a way to enter a site key instead of the widget embedding script, and it uses the site key to generate the widget embedding script and add it to all or some of the web pages managed by such publishing platform. The function of the plugin or add-on is to take the site key provided by seller portal 134, add it to the rest of the widget embedding script, which is invariant except for the site key, and add the resulting widget embedding script to the correct pages of seller website 125, i.e. those web pages that incorporate images that either represent digital media items to be used to create a product or which represent products themselves.

Each of the three abovementioned methods for adding widgets to a web page are common practice and are thus familiar to website and blog creators. Seller 115 does not need to have sophisticated technical programming knowledge to use any of these methods.

Once embedded in a web page, when buyer 105 visits seller website 125, the widget embedding script is executed as part of the web page provided by web services 625. An example of a typical widget embedding script is provided below

```
<script type="text/javascript"
    src="http://widget.edecs.com/stores/script/
    e79daf52e7f09ec39d8892341fab991c7b84814a.js">
</script>
```

As shown in the above example, the widget embedding script references a specific program that resides on EDECS server 130. When the widget embedding script is included in an HTML page and executed by a web browser running in buyer computer 110 it instructs the web browser to send an HTTP request requesting that EDECS server 130 provide the referenced client-side script, i.e. dynamic page analyzer 605.

The name of the client-side script has the form "<site key>.js" where site key is the site key stored in seller database 631. EDECS server 130, upon receiving the HTTP request, looks up the site key in seller database 431, and uses it to determine which seller 115 and which seller website 125 it belongs to. Also, for purposes of security, it looks up the HTTP_REFERRER of the HTTP request to see what domain the request has come from. If the domain of the web server that sent the HTTP request (based on HTTP_REFERRER) does not match the domain of seller website 125 the request is denied. Otherwise, EDECS server 130 determines that this is a legitimate request. Then, EDECS server 130 looks up the site key in product database 633 to obtain a list of what products seller website 125 offers. Then, EDECS server 130 adds the list of the products to dynamic page analyzer 605, and sends it back to the web browser.

Dynamic Page Analyzer

Figure 7:
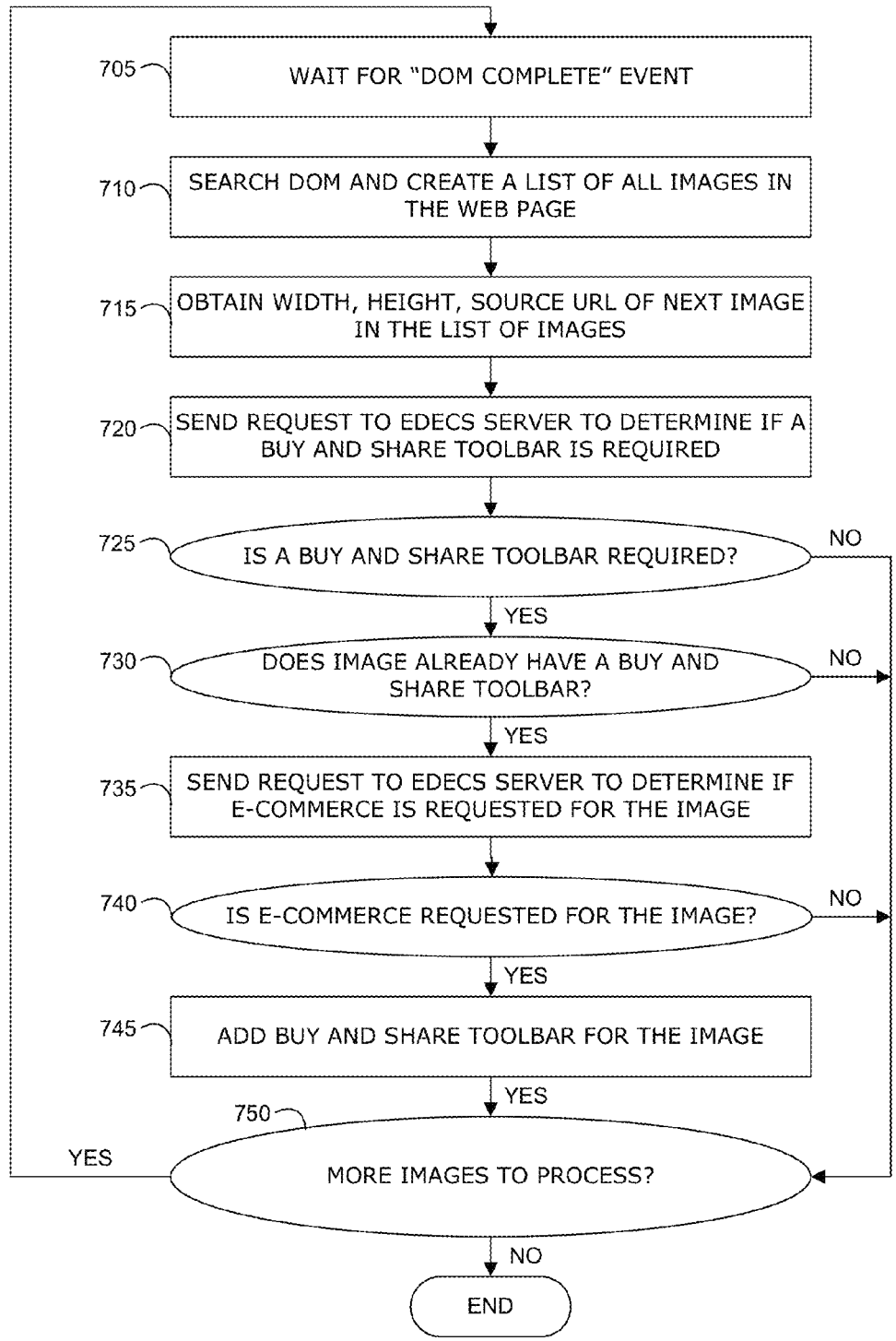
FIG. 7 is flow diagram that describes the processing performed by a dynamic page analyzer to determine if a buy and share toolbar should be placed in proximity to an image on a seller website and if so, where to place the buy and share toolbar, in accordance with an embodiment of the present invention.

Now reference is made to FIG. 7, which is flow diagram that describes the processing performed by a dynamic page analyzer to determine if a buy and share toolbar should be placed in proximity to an image on a seller website and if so, where to place the buy and share toolbar, in accordance with an embodiment of the present invention.

As previously discussed, the widget embedding script instructs the web browser running in buyer computer 110 to send an HTTP request to EDECS server 130 for dynamic page analyzer 605. In response, EDECS server 130 sends dynamic page analyzer 605 to buyer computer 110 in an HTTP response message. The web browser running in buyer computer 110 then executes dynamic page analyzer 605, which is a client-side script. Dynamic page analyzer 605 examines the Document Object Model (DOM) for the web page in order to determine the location of and to place instances of buy and share toolbar 204 within the web page.

By way of background, once a web page is completely downloaded by a web browser, even if external objects such as images and scripts are being downloaded in parallel or client-side scripts are executing, the web browser creates a Document Object Model, or DOM, which is a data structure that reflects the hierarchy of the HTML elements that belong to this page. The DOM describes all of the HTML elements in the page and how they are related, including any images or videos or text that represent the content of the page. The DOM is specified by the World Wide Web Consortium as part of the specification for the hypertext markup language (HTML). There are standard software libraries that enable client-side scripts to traverse or analyze a DOM and to search for certain elements. Once the DOM has been constructed by the web browser, which, as mentioned, does not necessarily mean that elements of the page have been downloaded, the web browser fires an event indicating that the DOM is ready. Such event can be received by a client side script such as dynamic page analyzer 605.

Now referring to FIG. 7, at step 705, initially, dynamic page analyzer 605 waits for a "DOM complete" event to be indicated by the web browser running in buyer computer 110. One method to accomplish this is for dynamic page analyzer 605 to schedule itself to run at a later time, using a timer, if the event has not occurred. Such timers are typically available in client-side scripting languages. An example client-side script written in JAVASCRIPT is presented below. In the example, dynamic page analyzer 605 determines if the DOM has been constructed yet and if not, instructs the web browser to call dynamic page analyzer 605 again 500 milliseconds later.

```
function runInit(site_key)
{
    still_initialzing = getEvent(DOM_LOAD);
    if (still_initializing) {
        init_timer = setTimeout(
            function( ) {FOTOMOTO.runInit( );}, 500
        );
    }
}
```

When the DOM has been constructed, at step 710 dynamic page analyzer 605 continues execution and searches the DOM and creates a list of all images in the web page. Typically, dynamic page analyzer 605 uses a DOM manipulation library such as the Yahoo! User Interface Library (YUI) library, from YAHOO! INC. of Sunnyvale, Calif. However, any DOM manipulation library can be used for this purpose. In the following code example, YUI is used to search the DOM and create a list of the images, named image_list, on the web page.

```
var image_list = YUI.util.Dom.getElementsBy(function(el){
    return EDECS.validateImage(el);
}, "img");
```

Image_list is an array of HTML elements. The elements that are stored in image_list are image properties including width, height, and the location of the image, i.e. the source URL.

Next, dynamic page analyzer 605 sequentially processes each image in the in the image list and determines for each image if an instance of buy and share toolbar 204 must be added to the image and if so adds an instance of buy and share toolbar 204 in the proper location inside the HTML web page. The code example below provides the core algorithm for this processing routine.

```
for (var i=0; i<image_list.length; i++) {
    var image = image_list[i];
```

```
    var w = image.width;
    var h = image.height;
    var url = image.src;
    if (EDECS.ignoreImage(site_key, w, h, url))
        continue;
    if (hasToolbar(image))
        continue;
    imageAvailability = EDECS.getImageAvail(site_key, url);
    if (imageAvailability.isSoldOut)
        continue;
    if (imageAvailability.isNotForSale)
        continue;
    imageProducts = EDECS.getImageProducts(site_key, url);
    EDECS.addToolbar(image, imageProducts);
}
```

At step 715 dynamic page analyzer 605 first obtains the width and height of the image, as well as its source URL, and passes them as parameters to the "ignoreImage" function. Next, at step 720 dynamic page analyzer 605 sends an HTTP request to EDECS server 130, including the site key and image URL as parameters, requesting that EDECS server 130 determine if the image needs to have an instance of buy and share toolbar 204 displayed in proximity to it. At step 725 EDECS server 130 determines if an instance of buy and sell toolbar 204 is required. It does this by determining if seller 115 has configured any parameters using seller portal 420, as discussed with reference to FIG. 4A, that would indicate that no buy and share toolbar 204 should be added in proximity to the image. If no instance of buy and share toolbar 204 is required then processing continues at step 750.

If an instance of buy and share toolbar 204 is to be added in proximity to the image, then, at step 730 dynamic page analyzer 605 determines if the image already has an instance of buy and share toolbar 204, i.e. whether the code to display buy and share toolbar 204 in proximity to the image has already been added to the web page. If an instance of buy and share toolbar 204 has already been added to the web page, then processing continues at step 750.

At step 735, dynamic page analyzer 605 sends an HTTP request to EDECS server 130 to determine if e-commerce is requested for the image by seller 115. As discussed with reference to FIG. 4A, seller 115 may use seller portal 420 to specify that e-commerce is not to be provided relative to an image. At step 740 EDECS server 130 determines if seller 115 has requested e-commerce for the image. If seller 115 has specified that e-commerce not be provided for the image then processing continues at step 750.

If e-commerce service is to be provided for the image then, at step 745, dynamic page analyzer 605 calls the addToolbar( ) function to add the toolbar to the image. The addToolbar( ) function, which is part of dynamic page analyzer 605 generates the web page code, including HTML and any client-side scripting code required, to add an instance of buy and share toolbar 204 in proximity to an image. The method used by the addToobar( ) function to add an instance of buy and share toolbar 204 in proximity to an image is described below.

Finally, at step 750 dynamic page analyzer determines if there are more images in the list of all images in the web page to process. If there are images remaining to process then processing resumes at step 705. If there are no further images to process the method terminates.

Adding a Buy and Share Toolbar in Proximity to an Image

When the addToolbar( ) function is executed to add buy and share toolbar 204 in proximity to an image, it first determines whether seller 115 has customized the location of buy and share toolbar 204. Customizing the location of the buy and share toolbar 204 can be done by adding optional HTML DIV elements to the page. The seller 115 can add an HTML DIV tag to the web page, with a unique HTML ID known to the EDECS server, such as <div id="EdecsToolbar"></div>. The dynamic page analyzer 605 inserts buy and share toolbar 204 inside this HTML DIV. This allows the seller to specify the location of buy and share toolbar 204 on the web page.

Seller 115 can provide "hints" about the location of buy and share toolbar 204 by setting customization controls provided by seller portal 134. EDECS server 130 then sends these hints to dynamic page analyzer 605. These hints are parameters stored in the seller database 631 for seller website 125, and are fetched by dynamic page analyzer 605 from EDECS server 130 using an HTTP request/response exchange. These parameters allow the seller 115 to specify inter alia that (1) buy and share toolbar 204 should be inserted above, below, or on top of (overlapping) the photo, (2) buy and share toolbar 204 should be centered, or left justified or right justified with respect to the photo. It may be noted that all of the aforementioned locations for buy and share toolbar 204 are considered to be "in proximity" to the photo.

Dynamic page analyzer 605 uses the previously discussed YUI library to traverse and search the HTML elements of the web page to see if the DIV for customizing the location of buy and share toolbar 204 already exists. If not, then dynamic page analyzer 605 automatically determines where to add buy and share toolbar 204 relative to each image, and in doing so applies the hints described above. While automatically determining, dynamic page analyzer 605 creates new DIV elements, one for each image it finds in the DOM, so that there is one buy and share toolbar 204 for each image. Dynamic page analyzer 605 generates unique HTML IDs for each such DIV in the form of <div id="EdecsToolbar_XXXXXX"></div> where XXXXXX is different for each image.

As shown in the example code below, dynamic page analyzer 605 fetches the hints along with other configuration information from EDECS server 130. This configuration is shown as EDECS_CONFIG in the example code. Dynamic page analyzer 605 creates a DIV element for the buy and share toolbar 204 of the image. The variable box_list_hint is a list of HTML elements that dynamic page analyzer 605 traverses "outwards", to place the buy and share toolbar one or more boxes "outer" than the actual image. It can contain the name of the element (such as p for paragraph, or div for a DIV), or the class of the elements, or the ID of the elements.

An example implementation of how dynamic page analyzer 605 determines where to add the buy and share toolbar 204 using JAVASCRIPT is provided below.

```
this.toolbar = document.createElement("div");
this.bar_id = "EdecsToolbar_"+this.id;
var box_list = EDECS_CONFIG.box_list_hint;
var img_box = this.image;
for (var i=0; i<box_list.length; i++) {
    var box = this.image;
    var list = box_list[i].split(" ");
    for (var j=0; j<list.length; j++) {
        if (/^#/.test(list[j])) { // id of element
            box =
                YUI.util.Dom.get(list[j].replace(/^#/,""));
        } else if (/^\./.test(list[j])) { // class of element
            box =
                YUI.util.Dom.getAncestorByClassName(box,
                    list[j].replace(/^\./,""))
        }else { // name of element
            box =
                YUI.util.Dom.getAncestorByTagName(box, list[j]);
        }
```

```
        if (!box)
            break;
    }
    if (box) {
        img_box = box;
        break;
    }
}
```

The code above traverses the DOM, from the image outward, to find the right "img_box", which is treated by dynamic page analyzer 605 as the "final box for the image" where buy and share toolbar 204 should be added. Once this box is known, dynamic page analyzer 605 uses the toolbar_position_hint to add buy and share toolbar 204 above, below, or over the image. Adding buy and share toolbar 204 means dynamically adding a new HTML element to the page, which is achieved by adding a new node to the DOM data structure at the right place. This is performed using the YUI library as follows:

```
if (typeof(EDECS_CONFIG.toolbar_position_hint)!="undefined")
{
    this.toolbar_position =
EDECS_CONFIG.toolbar_position_hint;
} else {
    this.toolbar_position =
EDECS_CONFIG.DEFAULT_POSITION;
}
if (img_box) {
    switch (this.toolbar_position) {
        case "1": //top position: toolbar showing above photo
            YUI.util.Dom.insertBefore(this.toolbar, img_box);
            break;
        case "2": //overlay position: toolbar showing over the photo
            insertOverlay(this.toolbar, img_box);
            break;
        case "0": // bottom position: toolbar showing below photo
        default:
            YUI.util.Dom.insertAfter(this.toolbar, img_box);
            if (siblingImage)
                YUI.util.Dom.insertAfter(document.createElement("br"),
                    this.toolbar);
    }
}
```

Thus, buy and share toolbar 204 is added to the DOM and therefore to the web page. Buy and share toolbar 204 appears when the web browser renders the web page to the display of buyer computer 110.

Figure 8:
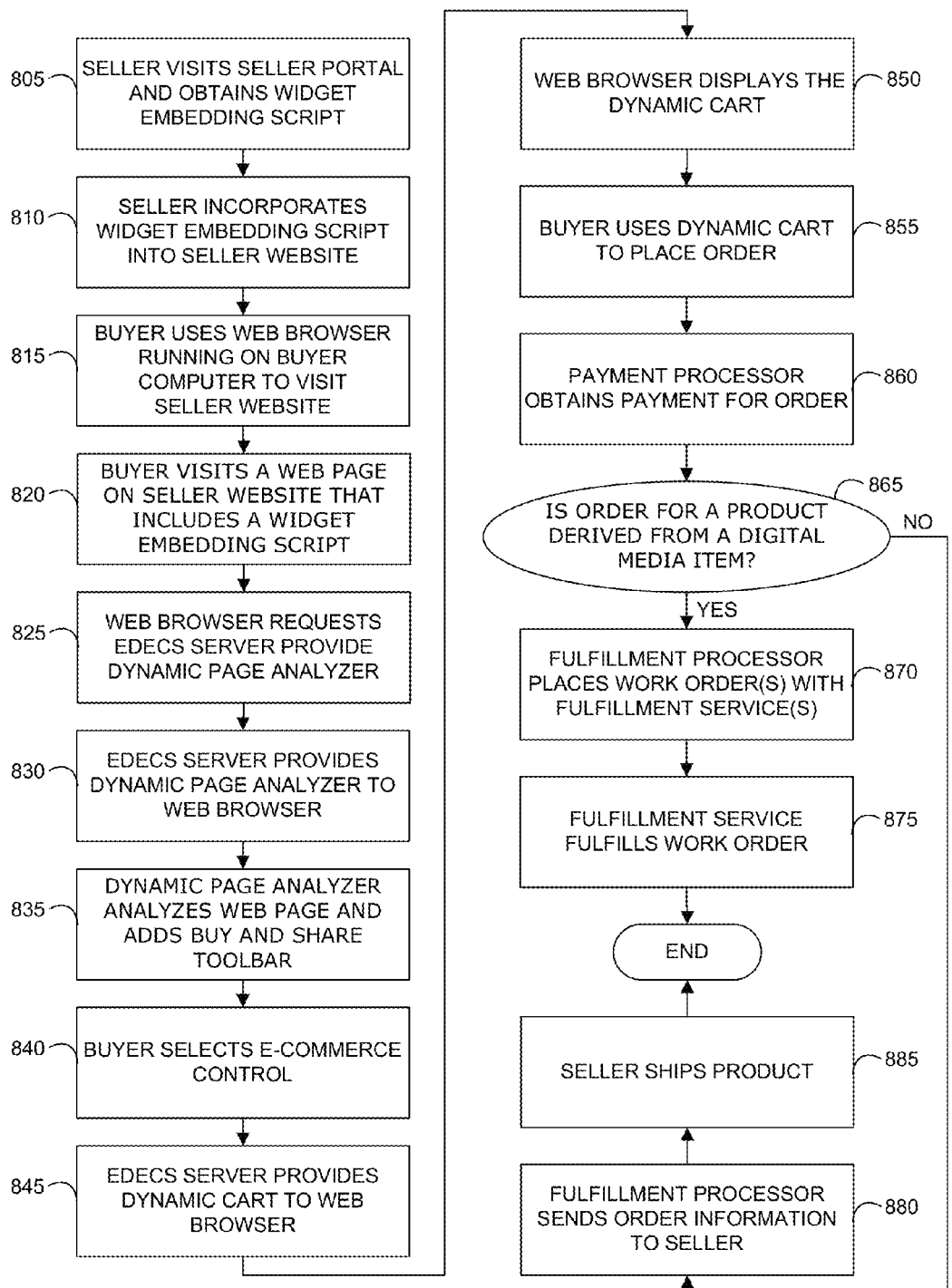
FIG. 8 is a flow diagram of an overall method used to purchase a product using an embeddable distributed e-commerce and community building system (EDECS), in accordance with an embodiment of the present invention.

Now reference is made to FIG. 8, which is a flow diagram of an overall method used to purchase a product using an embeddable distributed e-commerce and community building system (EDECS), in accordance with an embodiment of the present invention. At step 805 seller 115 uses his/her browser, running on seller computer 120 to visit seller portal 134. If seller 115 is not already registered as a seller with EDECS 100 then seller portal 134 enables seller 115 to register. If seller 115 is already registered, then seller 115 simply signs in. Upon registration or sign-in, seller 115 provides the URL of seller website 125 to seller portal 134 and seller portal 134 generates an appropriate widget embedding script for seller website 125.

At step 810 seller 110 incorporates the widget embedding script into seller website 125 in such a way as to be embedded in the HTML code for every page that displays a creation that seller 110 wishes to obtain e-commerce service for using EDECS 100. Typically, one way to do this is to copy the widget embedding script into a template that defines the look, feel, and function of each web page that displays a creation. As previously discussed, a creation may be inter alia a digital media item that will be used to create a product such as a print, or it may be a physical product itself that will be taken out of stock and shipped.

At step 815 buyer 105 uses his/her web browser, running on buyer computer 110, to visit seller website 125. At seller website 125, buyer 105 browses, searches for, and reviews information about various creations. At step 820 buyer 105 visits a web page on seller website 125 that includes a widget embedding script. At step 825, when the web browser executes the widget embedding script it causes the web browser to send a message to EDECS server 130 requesting that EDECS server 130 provide dynamic page analyzer 605. At step 830 EDECS server 130 provides dynamic page analyzer to the web browser running in buyer computer 110.

At step 835 dynamic page analyzer 605 analyzes the web page and adds instances of buy and share toolbar 204 as required to the web page. In a preferred embodiment, dynamic page analyzer 605 places each instance of buy and share toolbar 204 in proximity to a corresponding image. The placement of the buy and share toolbar 204 relative to each image that displays a creation may be customized by seller 115 using seller portal 134.

At step 840 buyer 105 selects an e-commerce control on the buy and share toolbar 204 that is placed in proximity to an image, where an e-commerce control is typically a request to purchase either a product incorporating the media item represented by the image or a product depicted in the image. Typical such requests include buy a print, buy a card, buy the product. Selecting an e-commerce control causes the web browser running in buyer computer 110 to create and send an HTTP message to EDECS server 130 requesting a dynamic cart. In response, at step 845 EDECS server 130 provides a dynamic cart to the buyer's web browser. Then at step 850 the buyer's web browser displays the dynamic cart inside the currently displayed web page. The dynamic cart is a client-side script that when executed by the buyer's web browser creates an interactive shopping cart appropriate to the product selected for purchase within the currently displayed web page. Thus, buyer 105 does not have to leave the web page in order to engage in e-commerce for a media item or product depicted on the web page.

At step 855 buyer 105 uses the dynamic cart to specify a purchase order. This step includes selecting any options such as quantity and size, checking out, providing a shipping address, selecting a shipping method, selecting a payment method, and providing method of payment information. When buyer 105 finishes specifying the purchase order, the buyer's web browser sends a message to EDECS server 130 that includes the purchase order specification. In one embodiment, back office and business logic component 630 notifies seller 115 when a purchase order for one of their creations is placed. Seller 115 can track the status of a purchase order using features provided by seller portal 134.

At step 860 payment processor 645 obtains payment for the purchase order from payment processing service 135. For each payment collected, back office and business logic component 630 credits a portion of the sales amount to a seller account for seller 115.

At step 865 back office and business logic component 630 determines if the purchase order is for a product derived from a digital media item such as a printed digital image or a card that includes a printed version of a digital image. If so, then processing continues at step 870. If not, then the purchase order is for a product depicted by an image, rather than a product that incorporates the image, and processing continues at step 880.

At step 870 EDECS server 130 uses fulfillment services processor 640 to place work orders with at least one fulfillment service 140. At step 875, the at least one fulfillment service 140 completes the work order and ships a completed product. The product may be shipped to buyer 105 or to another person designated by buyer 105 during the ordering process.

At step 880 EDECS server 130 sends purchase order information to seller 115 notifying him/her that buyer 105 has placed a purchase order for a product provided by seller 115. The purchase order information includes shipping information and information about any product options selected by buyer 105. At step 885 seller 115 ships the ordered product to the designated product recipient at the designated shipping address.

Typically, EDECS server 130 will provide electronic updates to buyer 105 at one or more points during the fulfillment process. Typically, EDECS server 130 provides electronic updates via email messages when payment has been successfully obtained, when a work order has been placed with a fulfillment service 140, and when a fulfillment service 140 fulfills a work order and ships a completed product, when purchase order information has been sent to seller 115 and when seller 115 ships a product.

Buyer 105 may visit buyer portal 132 to check the status of the purchase order at any time.

Also, on a periodic basis, back office and business logic component 630 makes an electronic payment to seller 115 for the aggregated portion of sales credited to his/her seller account. Such electronic payments are typically performed monthly.

Auto Pick-Up of Digital Media for Fulfillment Processing

In many cases a seller will provide a preview of display version of a digital image digital video, or other digital media item, that enables a buyer to preview the digital media item on seller website 125. For example, in the case of a digital image, a display version may be low resolution or watermarked. Such a digital media item that is intended for purposes of preview or display is henceforth referred to as a "display image." The resolution of the display image generally matches the resolution of images on commercial display monitors, typically in the range of 70-125 dots per inch (DPI). However, to fulfill a purchase it may be preferable to use a different version of the digital media item, referred to as the "substitute image", for example a higher resolution digital image, or a digital image in a different format or color model. An auto pick-up feature enables the seller to indicate that such substitution is required and enables EDECS server to retrieve the substitute image and to provide it to fulfillment service 140 it for order fulfillment in place of the display image.

Upon receipt of a purchase order, EDECS server 130 checks to see if the seller has defined any auto pick-up profiles. If so, EDECS server 130 will evaluate the auto pick-up profiles to determine if it should retrieve a substitute image stored in an external storage system. In a preferred embodiment, the seller specifies an auto pick-up profile for each external storage system used to store his/her digital media files. An auto pick-up profile includes an auto pick-up rule, also referred to as a lookup pattern, and a method for retrieving a substitute image from an external storage system. The retrieved substitute image is then used in the subsequent fulfillment steps of a purchase order. Although this feature is typically used, as previously discussed, to substitute a higher resolution image suitable for printing for a display resolution image there is no such requirement in the system and relationships other than low res-high res between the display image and the substitute image are feasible.

Now reference is made to FIG. 9, which provides an exemplary user interface, referred to as auto pick-up interface 900, that enables a seller to define an auto pick-up profile to be used for substituting a digital image from an external storage system for a digital image used for purposes of display, in accordance with an embodiment of the present invention. Auto pick-up user interface 900 enables a seller to define an auto pick-up profile for a plurality of external storage systems where a profile includes all the information required to replace a display image with another image available on one of the external storage systems. A profile list control 902 enables the seller to view, delete, and modify previously created auto pick-up profiles. A profile creator control 904 enables a user to provide a name for the profile, specify the type of external storage system, provide corresponding connection details such as a FTP username and a FTP password, a host address and search path within the storage system. External storage systems may include inter alia any storage system accessed using a standard protocol such as HTTP, HTTPS, and FTP, Amazon S3 offered by Amazon, Inc. of Seattle, Wash., Dropbox of San Francisco, Calif. and Box.net of Palo Alto, Calif. Generally, the method supports any type of external storage system including commercially available storage services and private storages services, e.g. private corporate or government storage systems. Depending on the type of storage specified, entry fields are provided that enable the seller to enter the information required to access that type of storage.

Auto pick-up user interface 900 enables a seller to define an auto pick-up match pattern, or lookup pattern, which includes a text string and a replacement text string. The matching algorithm evaluates a filename to determine if it includes a match pattern and replaces it with a seller defined text string or pattern. Using entry box 906 a seller can define a match pattern. For example, if the display filename is "SunnyDay-SiteLowRes.jpg" and if the match pattern is "-SiteLowres" and the replacement text is "-HighresPrint" then the new filename "SunnyDay-HighresPrint.jpg" would result.

A path mapping control 908 enables the seller to, optionally, define a path mapping. A path mapping enables a display file stored in a specific path on one storage system to be matched with a file in a specific folder in a different storage system.

Further, metadata associated with a digital media item can be used to create a substitute filename. For example the date of creation of a digital media file can be added to the filename to ensure that a specific version is retrieved.

Automated Processing Using Collections

EDECS 100 enables sellers to sell items from their website without first having to add the items to a product catalog or establish pricing on a product-by-product basis. In preferred embodiment, this capability is enabled through the use of collections. A collection provides a way for a seller to group a number of digital media items and to define and apply rules to all members of the collection. For example, a seller may define a collection and then set a single price for a printed card that includes a photograph from the collection. Collections are typically defined by the seller in relation to the various products offered, for example to reflect differences in sizes and pricing. In a preferred embodiment, a collection is a set of media items and a media item belongs one and only one collection at a given time. In this embodiment, rules such as product pricing and availability may be defined at the collection level. In other embodiments, a digital media item can belong to multiple collections or to no collection at all.

Collections, as specified herein, enable a seller to flexibly manage a large number of media items. In contrast, prior art e-commerce marketplaces typically treat each product, or each digital media item, as a separate stock keeping unit (SKU).

In a preferred embodiment, when a seller signs in with the system for the first time, three collections are created by EDECS server 130 for him/her: a For Sale collection, a Not For Sale Collection, and a Share Only collection. The For Sale collection includes digital media items for which e-commerce has been requested. The Share Only collection includes digital media items for which sharing services are provided but no products based on the digital media items are sold; in one embodiment, only e-cards and share controls are available on the buy and share toolbar for media items in the Share Only collection. The Not For Sale collection includes digital media items for which no e-commerce or sharing has been requested; no buy and share toolbar is displayed for digital media items in the Not For Sale collection.

Using a seller interface provided by seller portal 134, a seller can create additional collections, edit and delete collections. A collection can also include files other than digital media files such as text, word processing, database, spreadsheet, web pages, and the like.

In addition, assignment rules can be created by a seller. An assignment rule provides instructions that enable EDECS server 130 to assign a digital media item to a collection automatically based on tags or metadata included in the digital media item. The terms tag and metadata are used interchangeably herein to refer to information about the digital media item that is separate from the media content. Tags may be included inside the media file or may be stored separately, for example in a database or web page.

In its most general form an assignment rule has the form:
if <term> then <action>
where <term> is a BOOLEAN expression that involves one or more tags and <action> defines an automated action to perform on the digital media item. One typical action, discussed hereinbelow, is the automated assignment of the digital media item to a specific collection when <term> is evaluated as TRUE. Other actions may include inter alia sending an electronic notification to the seller, and performing a corresponding algorithm or routine that transforms the digital media item, for example a routine that changes its file format.

Figure 10:
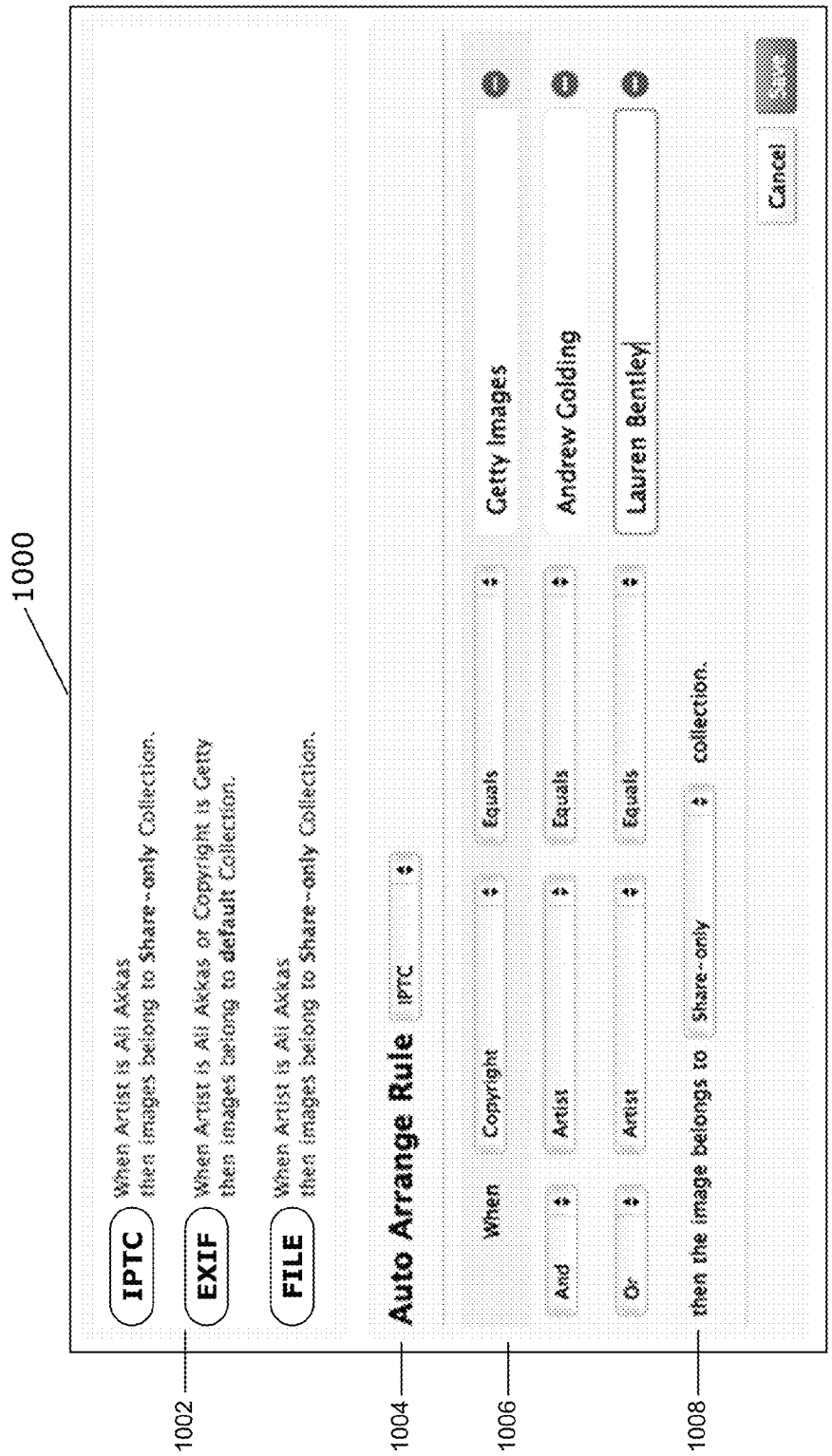
FIG. 10 provides an exemplary interface that is used by a seller to create a rule that is subsequently used to automatically assign a digital media item to a collection, in accordance with an embodiment of the present invention.

FIG. 10 provides an exemplary interface, referred to as create collection rules interface 1000, that is used by a seller to create a rule that is subsequently used to automatically assign a digital media item to a collection, in accordance with an embodiment of the present invention. A rules control 1002 lists each previously defined and active rule. Rules control 1102 enables a seller to inter alia move a rule up or down and thus change the order in which the rules are applied which in some cases will change the outcome of the assignment, determine if a rule is added using a logical AND or OR operation, and delete a rule. Multiple, overlapping, rules can be defined. For example, one rule can be to move images larger than 2000×3000 pixels to a collection named "High res." A second rule is to assign images with the text string "Paris" in their file name to a collection named "Trips". Each rule would assign an image larger than 2000×3000 pixels with a filename "ParisPhotos.jpg" to a different collection. In a preferred embodiment, rules are implemented in the order that they appear in rules control 1102 and a media item that has already been assigned by a rule is not reassigned by a subsequent assignment rule. In another embodiment, each assignment rule is implemented in order and a media element can be assigned multiple times. In yet another embodiment, the seller can specify a weight for each assignment rule and in cases where multiple assignment rules apply to a media file then only the assignment rule with the largest weight is applied.

For each rule, the type of assignment rule is indicated along with a succinct description of the rule. In this example, three rules, each relating to a different type of metadata are shown. The three types of metadata shown are IPTC, EXIF, and File-level. IPTC refers to an industry standard set of tags used in digital images, maintained by the International Press Telecommunications Council (IPTC) based in London, UK. IPTC tags which are typically used by news agencies, news publishers and vendors include user notes, country code, description or caption, headline, keywords, subject code, date created, title, copyright notice, creator, etc. EXIF refers to Exchangeable Image File Format, an industry standard for the format, including, tags of digital image files especially those produced by digital cameras and scanners. EXIF Version 2.3, the most recent version of the specification was jointly formulated by two industry organizations: JEITA and CIPA. EXIF tags include manufacturer, model, software, compression, resolution, exposure time, metering mode, flash, color space and focal length. File-level tags are typically specific to the computer system on which a file resides and are managed by the computer operating system. File-level tags typically include filename, path, file size, date created, date modified, and read/write/create/modify attributes. Other types of metadata or tags can be used in the <term> portion of a rule. For example, geographic metadata, often referred to as geotags, define a geographic location, typically the location where a digital media item was captured; color metadata identify the colors that appear in a media item, and facial metadata is used to identify an individual that appears in a digital photo, digital video or other digital media item.

A type of rule control 1004 allows the seller to select the type of assignment rule to be created. In one embodiment the types of rules include EXIF, IPTC and File (File-level). However, when working with other types of media, e.g. digital video or digital music, then other types of assignment rules are provided.

A create rule control 1006 enables a seller to edit an assignment rule or create a new assignment rule. In the exemplary user interface, assignment rules are Boolean expressions based on tags available from with the type of rule selected using type of rule control 1004. For example, if IPTC is selected as the type of rule then the expression involves values for one or more IPTC tags. In the example, the seller has created the expression "Copyright Equal Getty Images And Artist Equals Andrew Golding Or Artist Equals Lauren Bentley."

Using a collection assignment control 1008 the seller specifies which collection to assign a digital image matching the expression defined using create rule control 1006. Thus, in the example, digital images matching the expression are assigned to the Share-Only collection.

In addition to automatic assignment of digital media items to collections based on rules, using a user interface provided by seller portal 134 the seller can explicitly assign one or more digital media items to a collection. Such an explicit assignment overrides any previous automatic assignment based on rules. Terms that involve a filename look for occurrences of textual patterns within the filename. For example, a filename-based term might look for the text string "ocean" at the beginning or anywhere within the filename.

In a preferred embodiment, each digital media item that corresponds to a display image encountered by a dynamic page analyzer when processing a web page on seller website 125 is added by EDECS server 130 to a collection. Either the digital media item is added based on the dynamic page analyzer's assessment of whether digital media item belongs in one of the three default collections (For Sale, Not For Sale, Share Only) or it is added based on the rules defined by seller 115 using create collection rules interface 1000. It may be appreciated by one skilled in the art that no ingest process is required in order to assign media items to collections and thus derive benefits such as uniform pricing, as discussed below. In contrast in prior art e-commerce systems for digital media items a sophisticated ingest process is typically performed at the time media items are added to the system. Such an ingest process is feasible in prior art system because the media items are typically centrally managed, i.e. they are not under the control of a plurality of sellers as is the case with EDECS 100

Figure 11:
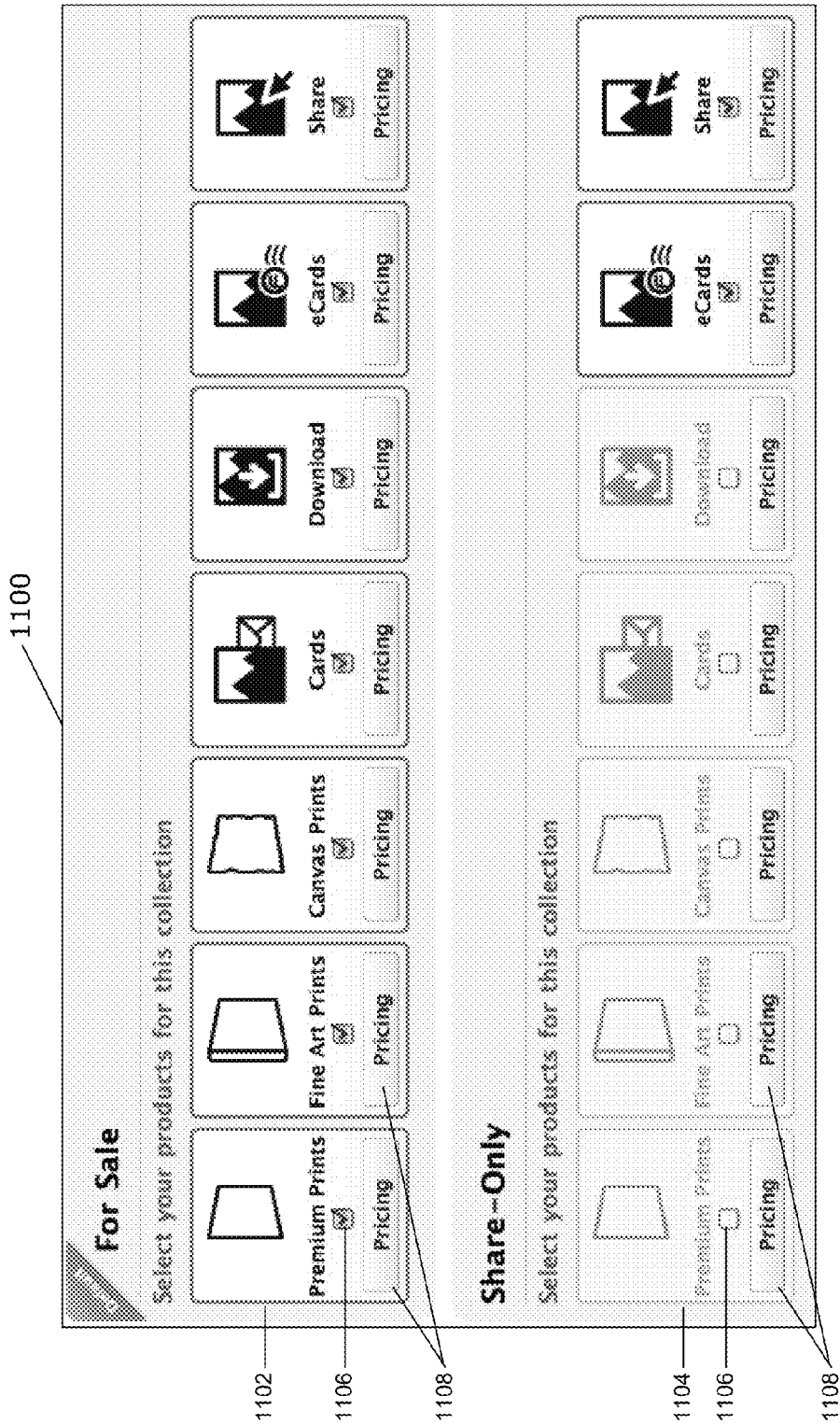
FIG. 11 is an exemplary user interface that enables a seller to interactively specify, for each collection, which products to make a available to buyers, in accordance with an embodiment of the present invention.

Now reference is made to FIG. 11, which is an exemplary user interface, referred to as collections user interface 1100, that enables a seller to interactively specify, for each collection, which products to make a available to buyers, in accordance with an embodiment of the present invention. In addition, the collections user interface 1100 enables the seller to establish pricing for each product available for a collection. Collections user interface 1100 is provided to seller 115 using a control provided by seller portal 134. In the example shown in FIG. 11, the products available for two default collections, the For Sale collection 1102 and the Share-Only collection 1104 are indicated. Seller 115 simply clicks a toggle 1106 available in the panel for a product to indicate if the product is available for the corresponding collection. In the example, all products are checked, thus available, for the For Sale collection 1102 and only e-Cards and Share are selected for the Share-Only collection 1104. In addition, seller 115 can select a pricing control 1108 that enables him/her to establish pricing for that product. Pricing set in this way only pertains to products ordered in conjunction with a digital media item from the selected collection. While only two collections are depicted in the example, if additional collections have been defined by seller 115 then they are also available by scrolling down using collections user interface 1100.

Implementation of Auto Pick-Up and Collections

Collections are managed by EDECS server 130. In particular, seller portal 134 provides user interfaces such as those provided in FIGS. 9-11, that enable the user to define auto pick-up profiles, create collections and specify rules and pricing to be applied to collections. In the case of auto pick-up, replacement of display images by substitute images is performed by back office and business logic component 630 as part of the fulfillment process. In the event that back office and business logic component 630 is not able to retrieve a substitute image it electronically notifies the seller as such by sending to the seller or to a designated intermediary inter alia an email, a text message or an automated voice message.

In the case of collections, back office and business logic component 630 first creates default collections when a seller initially registers with the system and thereafter, adds, creates and modifies collections based on requests by the seller made using seller portal 134. Information about collections is stored in seller database 631. Further, back office and business logic component 630 analyzes each web page added by the seller and adds digital media items that correspond to certain of the embedded images to collections based on rules defined by the seller or by default pre-defined rules. In a preferred embodiment, the rules for assigning images to collections are defined by the seller using a user interface such as that provided in FIG. 10. Back office and business logic component 630 supplies purchase price information as requested by the dynamic cart. A seller may override the collection pricing for a product by specifying pricing for the product using a user interface provided by seller portal 134. Such product-specific pricing is stored in product database 633.

Figure 12:
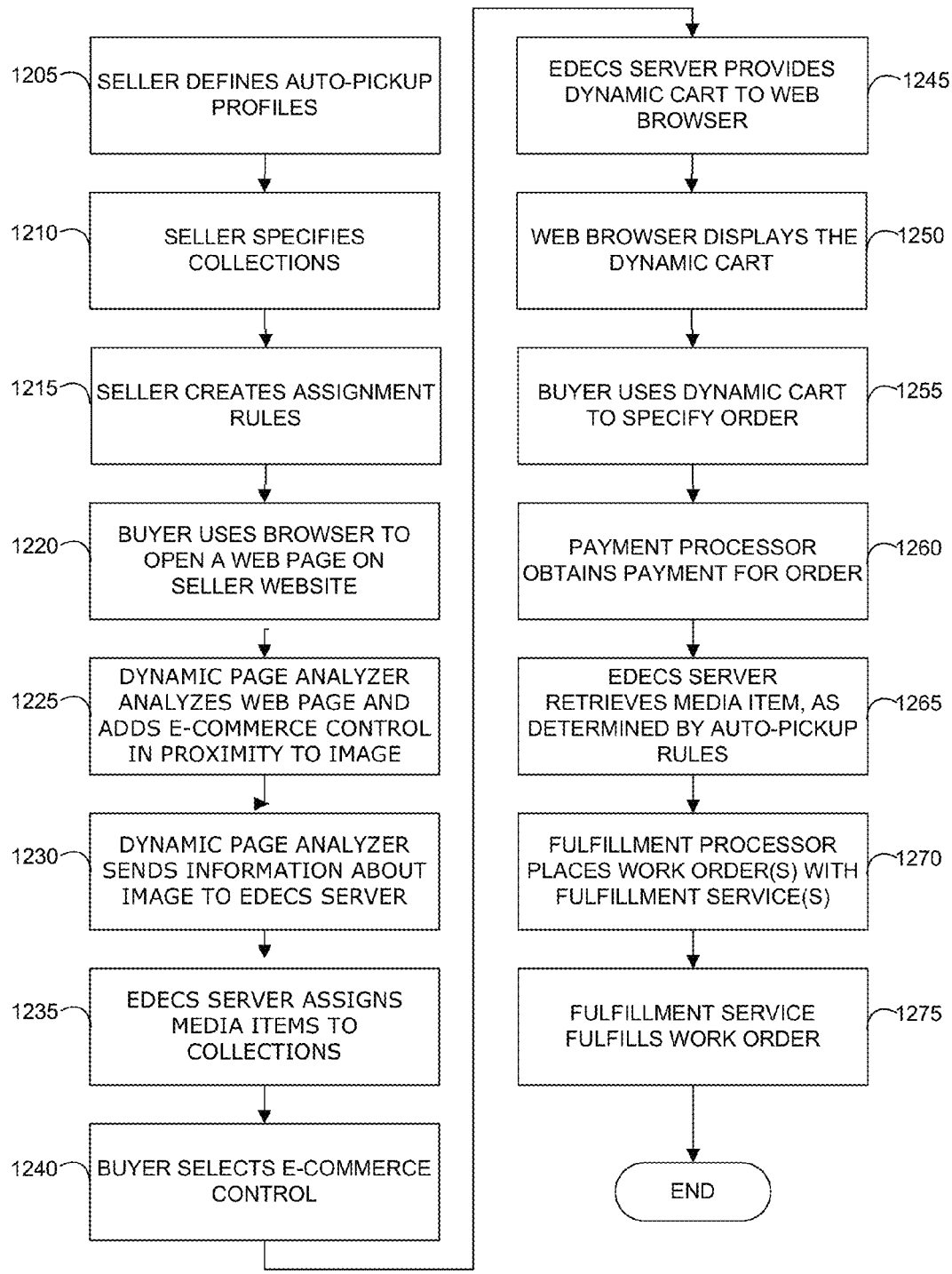
FIG. 12 is a flow diagram of an overall method used to purchase a product an embeddable distributed e-commerce and community building system (EDECS) that provides collections and automated pricing, in accordance with an embodiment of the subject invention.

Now reference is made to FIG. 12, which is a flow diagram of an overall method used to purchase a product an embeddable distributed e-commerce and community building system (EDECS) that provides collections and automated pricing, in accordance with an embodiment of the subject invention. The first three steps illustrated in FIG. 12, steps 1205-1215 are performed by the seller asynchronously relative to the other steps in FIG. 12 and can thus be performed out of order. Further, each of these three are optional, i.e. the seller may perform them at his/her discretion but is under no obligation to do so.

At step 1205, a seller visits seller portal 134 and defines one or more auto pick-up profiles using a user interface such as that shown in FIG. 9. At step 1210 the seller visits seller portal 130 and specifies one or more collections using a user interface provided by seller portal 130. Also, as part of this step, the seller may specify the products available for media items that belong to the collection, using a user interface such as that depicted in FIG. 11, and optionally the pricing for each of the available products As previously stated, this step is optional; thus, if the seller bypasses this step then only the default collections created by EDECS server 125 are available to be used in the following steps. At step 1215 the seller visits seller portal 130 and creates one or more assignment rules, using a user interface such as that depicted in FIG. 10, each assignment rule defining the assignment of digital media items to a collection.

At step 1220 buyer 105 uses his/her web browser, running on buyer computer 110, to open a web page on seller website 125. The web page includes a least one image that corresponds to a digital media item stored and managed by the seller. In a preferred embodiment, the seller stores some or all of his/her digital media items on one or more online, i.e. network connected or network accessible, external storage systems.

At step 1225, the buyer's web browser executes a script, such as the previously described dynamic page analyzer, which analyzes the web page and adds one or more e-commerce controls in proximity to each image for which e-commerce has been requested. In a preferred embodiment, the e-commerce controls placed in proximity to an image are implemented as an instance of buy and share toolbar 204.

At step 1230, the script sends information about each image that has an e-commerce control to EDECS server 130.

At step 1235 EDECS server identifies a digital media item that corresponds to each of the images and assigns each digital media item to a collection. If seller 115 has specified one or more assignment rules then these rules will be evaluated and the media item will be assigned accordingly. if no assignment rules have been specified or the media item doesn't satisfy any of the assignment rules, then the image is assigned to one of the three default collections described hereinabove.

At step 1240 buyer 105 selects an e-commerce control in proximity to an image, referred to hereinbelow as the selected image. Selecting an e-commerce control causes the web browser running in buyer computer 110 to create and send a message to EDECS server 130 requesting a dynamic cart. In response, at step 1245 EDECS server 130 provides a dynamic cart to the buyer's web browser. The dynamic cart is specific to the media item that corresponds to the selected image. Then, at step 1250 the buyer's web browser displays the dynamic cart inside the currently displayed web page. The dynamic cart is a client-side script that when executed by the buyer's web browser enables the buyer to specify an order for at least one product in conjunction with one media item.

The dynamic cart displays each product that can be ordered for the media item that corresponds to the selected image. If the media item has been assigned to a collection then the pricing of the media item and the list of products available for the media item is based on the collection to which the media item is assigned.

At step 1255 buyer 105 uses the dynamic cart to specify an order for one or more products. This step includes selecting any options such as quantity and size, checking out, providing a shipping address, selecting a shipping method, selecting a payment method, and providing method of payment information. When the user finishes specifying the purchase order, the web browser sends a message to EDECS server 130 that includes the purchase order information. In addition, the web browser sends information about the selected image, typically the information includes all link information including the filename of the selected image. In one embodiment, back office and business logic component 630 notifies seller 115 when a purchase order for one of their creations is placed. Seller 115 can track the status of the purchase order using features provided by seller portal 134.

At step 1260 payment processor 645 obtains payment for the purchase order from payment processing service 135. For each payment collected, back office and business logic component 630 credits a portion of the sales amount to a seller account for seller 115.

At step 1265 EDECS server 130 determines if seller 115 has specified auto pick-up rules. If so, then EDECS server 130 evaluates the received information about the selected image to determine if it satisfies one of the auto pick-up rules. If it does satisfy a rule then EDECS server 130 uses the corresponding retrieval method specified by seller 115 to retrieve the correct digital media item. If it doesn't satisfy a rule then, in a preferred embodiment, EDECS server 130 uses the display image for purposes of fulfillment.

At step 1270 EDECS server 130 uses fulfillment services processor 640 to place work orders with one or more fulfillment services 140, i.e. as many as are required to complete the purchase order. As part of this step, fulfillment services processor 640 supplies either the display version of the digital media item or the retrieved, substitute, version of the digital media item. At step 1275, each fulfillment service 140 completes their work order and a completed product is shipped. The product may be shipped to buyer 105 or to another person designated by buyer 105 during the ordering process.

Buyer 105 may visit buyer portal 132 to check the status of the purchase order at any time.

The distinction between the subject invention and centralized e-commerce marketplaces as well as between the subject invention and digital media management systems that make digital media available for licensing is that the prior art systems perform operations centrally and the digital media items are managed centrally. In contrast the subject invention enables each sellers to manage his/her own collection of digital media. Further, each seller may independently choose to store their digital media using a different storage system.

In reading the above description, persons skilled in the art will realize that there are many apparent variations that can be applied to the methods and systems described.

What is claimed is:

1. A method for e-commerce on a seller's website, comprising:
    (a) maintaining by an e-commerce server a catalog of products wherein each product is ordered in conjunction with one of a plurality of media items each represented by a unique media image selected by a buyer at the seller's website and wherein the price of the product varies in accordance with the media item and the media item is stored and managed by the seller separate from the ecommerce server;
    (b) providing an interface at the e-commerce server for the seller to set rules regarding at least information relating to the media images and media items;
    (c) receiving, by a buyer's web browser executing at a buyer's computerized device, separate from both the ecommerce server and the seller's website, the web page from the seller's website, said web page including each media image corresponding to the media items and said seller's website hosted by a web server remote from the e-commerce server;
    (d) enabling, by the web browser, the buyer to select one or more of the media images on the seller's website initiating download of a client side application to the buyer's web browser, said application embedded in the seller's website, as a result of selection;
    (e) sending information about the selected image, by the client side application, to the e-commerce server wherein the e-commerce server has no previous price information about said media items;
    (f) providing a dynamic shopping cart by the ecommerce server within the seller's web page as a result of receiving the information, said shopping cart specific to the media item represented by the selected image, displaying available products from the catalog available to be ordered in conjunction with the media item based in part by the rules;
    (g) selecting a product in the dynamic cart by the buyer and dynamically determining, by the e-commerce server, the purchase price of the selected product in conjunction with the media item, said purchase price based in part on the information about the selected image and the rules;
    (h) enabling, by the client side application, the buyer to specify, with the ecommerce server from within the shopping cart, a purchase order for the selected product at the purchase price determined by said dynamically determining.

2. The method of claim 1 further comprising:
    (i) maintaining by the e-commerce server one or more collections, each collection including a plurality of media items;
    (j) for each collection, enabling the seller to specify, via the interface, a purchase price for each product in conjunction with a media item from the collection; and
    (k) dynamically assigning, based on the information about the selected image, the desired media item to a collection; and wherein said dynamically determining is based on the collection to which the desired media item was assigned by said dynamically assigning.

3. The method of claim 2 further comprising enabling, by the ecommerce server, the seller to specify an assignment rule, via the interface, that designates a collection to assign a media item to if criteria relating to metadata for the media item are satisfied, and wherein said dynamically assigning assigns the desired media item to the collection designated by the assignment rule if the metadata for the desired media item satisfies the criteria.

4. The method of claim 3 wherein said metadata is selected from the group consisting of a filename, EXIF metadata, IPTC metadata, file-level metadata, color metadata, face metadata and geographic metadata.

5. The method of claim 1 further comprising adding, by the buyer's web browser, after receiving said web page from the seller's website, an ecommerce control in proximity to the selected image, wherein said enabling a user to select an image is performed using the e-commerce control.

6. The method of claim 1, further comprising:
    (i) enabling, by the interface, the seller to (i) specify an auto pick-up rule relating to information about an image on the seller's website, and (ii) specify a method corresponding to the auto pick-up rule for retrieving a media item corresponding to the image from an external storage system;
    (j) receiving, by the e-commerce server, the purchase order from the buyer's web browser, via the shopping cart, said purchase order including information about the selected image;
    (k) evaluating the selected image, by the e-commerce server, to determine if the selected image satisfies the auto pick-up rule; and
    (l) if the selected image satisfies the auto pick-up rule, retrieving, by the ecommerce server, the desired media item using the corresponding method specified by the seller.

7. The method of claim 6 wherein the information about an image is selected from a group consisting of a filename, EXIF metadata, IPTC metadata, file-level metadata, color metadata, facial metadata and geographic metadata.

8. The method of claim 6 further comprising sending, by the e-commerce server, an electronic notification to the seller if the desired media item is not successfully retrieved.

9. A computerized network e-commerce server storing and executing software providing an e-commerce system, comprising:
    a storage device at the e-commerce server storing a catalog of products sold by a seller on a seller's website, remote from the server;
    an interface provided by the software at the e-commerce server for the seller to set rules regarding at least information relating to the media images at the seller's website each image representing a media item managed and stored by the seller external from the e-commerce server; and
    an instance of the software embedded as a client side application in the seller's website providing a dynamic shopping cart and functionality;
    wherein a web browser operated by the buyer receives a web page from the seller's website, said web page including at least one of the media images corresponding to the media item and selection of the image by the buyer causes the browser to execute the instance of embedded software sending information about the image on the seller's website corresponding to the media item, said server having no previous purchase price information about said media item, and causing a
    dynamic shopping cart to display within the seller's web page, said shopping cart specific to the media item corresponding to the selected image displaying available products from the catalog available, based in part by the rules, to be ordered in conjunction with the media item, and the price of the displayed products vary in accordance with the media item; and dynamically determining, by the server, the purchase price of the selected product in conjunction with the media item, said purchase price based in part on the information about the selected image and the rules; and providing said purchase price to the shopping cart.

10. The computerized network server of claim 9 wherein the e-commerce server is operative to perform actions further comprising:
    maintaining one or more collections, each collection including a plurality of media items;
    for each collection, enabling the seller to specify a purchase price for each product in conjunction with a media item from the collection, via the interface; and
    dynamically assigning, based on the information about the selected image, the desired media item to a collection; and wherein said dynamically determining is based on the collection to which the desired media item was assigned by said dynamically assigning.

11. The computerized network server of claim 10 wherein the e-commerce server is operative to perform actions further comprising enabling the seller to specify an assignment rule, via the interface, that designates a collection to assign a media item to if criteria relating to metadata for the media item are satisfied, and wherein said dynamically assigning assigns the desired media item to the collection designated by the assignment rule if the metadata for the desired media item satisfies the criteria.

12. The computerized network server of claim 11 wherein said metadata is selected from the group consisting of a filename, EXIF metadata, IPTC metadata, file-level metadata, color metadata, face metadata and geographic metadata.

13. The computerized network e-commerce server of claim 9 operative to perform actions, further comprising:
    enabling the seller to (i) specify, via the interface, an auto pick-up rule relating to information about an image on the seller's website, and (ii) specify a method corresponding to the auto pickup rule for retrieving a media item corresponding to the image from an external storage system;
    receiving a purchase order from the shopping cart, said purchase order including information about the selected image;
    evaluating the selected image to determine if the selected image satisfies the auto pick-up rule; and
    if the selected image satisfies the auto pick-up rule, retrieving the corresponding media item using the corresponding method specified by the seller.

14. The computerized network server of claim 13 wherein the information about an image is selected from the group consisting of a filename, EXIF metadata, IPTC metadata, file-level metadata, color metadata, facial metadata and geographic metadata.

15. The computerized network server of claim 13 wherein the e-commerce server is operative to perform actions, further comprising sending an electronic notification to the seller if the desired media item is not successfully retrieved.

* * * * *